(12) United States Patent
Chabrol et al.

(10) Patent No.: US 10,106,635 B2
(45) Date of Patent: Oct. 23, 2018

(54) SECONDARY SUSPENDING AGENT FOR SUSPENSION POLYMERISATION REACTION

(71) Applicant: SYNTHOMER (UK) LIMITED, Harlow Essex (GB)

(72) Inventors: Virginie Chabrol, Harlow Essex (GB); Jon Batty, Harlow Essex (GB); Peter Shaw, Harlow Essex (GB); Christopher Davis, Harlow Essex (GB); Monika Farrell, Harlow Essex (GB)

(73) Assignee: Synthomer (UK) Limited (GB)

( * ) Notice: Subject to any disclaimer, the term of this patent is extended or adjusted under 35 U.S.C. 154(b) by 0 days.

(21) Appl. No.: 15/129,736

(22) PCT Filed: Mar. 27, 2015

(86) PCT No.: PCT/GB2015/050939
§ 371 (c)(1),
(2) Date: Sep. 27, 2016

(87) PCT Pub. No.: WO2015/145174
PCT Pub. Date: Oct. 1, 2015

(65) Prior Publication Data
US 2017/0129979 A1  May 11, 2017

(30) Foreign Application Priority Data

Mar. 28, 2014 (GB) .................................... 1405627.9
Dec. 3, 2014 (GB) .................................... 1421467.0

(51) Int. Cl.
*C08F 2/00* (2006.01)
*C08F 210/00* (2006.01)
(Continued)

(52) U.S. Cl.
CPC .............. *C08F 218/08* (2013.01); *C08F 2/20* (2013.01); *C08F 2/26* (2013.01); *C08F 114/06* (2013.01)

(58) Field of Classification Search
CPC .. C08F 2/20; C08F 2/26; C08F 218/08; C08F 228/02; C08F 114/06
(Continued)

(56) References Cited

U.S. PATENT DOCUMENTS 2,300,920 A   11/1942  Heuer
2,704,753 A    3/1955  Monaghan
(Continued)

FOREIGN PATENT DOCUMENTS

CN    102311516 A    1/2012
CN    103183774 A    7/2013
(Continued)

OTHER PUBLICATIONS

Allsopp, "Morphology of PVC", Manufacture and Processing of PVC, Chapter 7, 1982, pp. 151-182.
(Continued)

*Primary Examiner* — William K Cheung
(74) *Attorney, Agent, or Firm* — The Webb Law Firm

(57) ABSTRACT

Use of a polymer as a secondary suspending agent in a suspension polymerization reaction is provided. The polymer comprising (i) residues of at least one ester-containing monomer, the ester-containing monomer (s) comprising one polymerizable carbon-carbon double bond per monomer and an ester group, and (ii) residues of at least one monomer comprising a sulfonate, sulfonic acid, sulfonic ester, sulfonamide or sulfonyl halide group the monomer (s) comprising a sulfonate, sulfonic acid, sulfonic ester group, sulfonamide or sulfonyl halide group comprising one polymerizable carbon-carbon double bond per monomer and a sulfonate,
(Continued)

sulfonic acid, sulfonic ester, sulfonamide or sulfonyl halide group, the polymer optionally being partially hydrolyzed such that a proportion of said ester groups form alcohol groups, the degree of hydrolysis of the polymer being from 0 to 30 mol %.

25 Claims, 1 Drawing Sheet

(51) Int. Cl.
    *C08F 218/08*     (2006.01)
    *C08F 2/20*     (2006.01)
    *C08F 2/26*     (2006.01)
    *C08F 114/06*     (2006.01)

(58) Field of Classification Search
    USPC .......................................................... 526/201
    See application file for complete search history.

(56) References Cited

U.S. PATENT DOCUMENTS

| | | | |
|---|---|---|---|
| 2,834,759 A | 5/1958 | Austin | |
| 2,859,191 A | 11/1958 | Turnbull | |
| 3,219,608 A | 11/1965 | Ingleby et al. | |
| 3,265,654 A | 8/1966 | Glabisch et al. | |
| 3,320,199 A | 5/1967 | Brezinski et al. | |
| 3,501,432 A | 3/1970 | Wright et al. | |
| 3,925,290 A | 12/1975 | Matsuo et al. | |
| 3,959,205 A | 5/1976 | Kobayashi et al. | |
| 3,962,398 A | 6/1976 | Matsuo et al. | |
| 3,996,181 A | 12/1976 | Hayashi et al. | |
| 4,051,093 A | 9/1977 | Wendel et al. | |
| 4,316,976 A | 2/1982 | Wingrave | |
| 4,319,012 A | 3/1982 | Morningstar | |
| 4,324,878 A | 4/1982 | Biaggi et al. | |
| 4,388,442 A | 6/1983 | Taniguchi et al. | |
| 4,469,839 A | 9/1984 | Maruhashi et al. | |
| 4,645,812 A | 2/1987 | Maier | |
| 4,812,510 A | 3/1989 | Barnett et al. | |
| 5,268,412 A | 12/1993 | Raynolds | |
| 5,308,911 A * | 5/1994 | Takada ..................... | C08F 2/20 524/35 |
| 5,349,008 A | 9/1994 | Takada et al. | |
| 5,422,176 A | 6/1995 | Schuler et al. | |
| 5,439,008 A | 8/1995 | Bowman | |
| 5,484,840 A | 1/1996 | Binkley | |
| 5,629,378 A | 5/1997 | Takada | |
| 5,635,566 A | 6/1997 | Gerharz et al. | |
| 5,717,044 A | 2/1998 | Takada | |
| 5,753,774 A | 5/1998 | Chang | |
| 5,922,410 A | 7/1999 | Swartz et al. | |
| 5,962,580 A | 10/1999 | Nkansah et al. | |
| 5,973,029 A | 10/1999 | Hsu et al. | |
| 6,818,709 B1 | 11/2004 | Vicari | |
| 6,818,719 B2 | 11/2004 | Fujisawa et al. | |
| 7,022,656 B2 | 4/2006 | Verrall et al. | |
| 7,642,226 B2 | 1/2010 | Verrall et al. | |
| 7,745,553 B2 | 6/2010 | Such et al. | |
| 7,745,556 B2 | 6/2010 | Ferguson et al. | |
| 7,786,229 B2 | 8/2010 | Vicari | |
| 7,790,815 B2 | 9/2010 | Vicari | |
| 7,875,359 B2 | 1/2011 | Rodrigues et al. | |
| 7,932,328 B2 | 4/2011 | Vicari | |
| 7,994,265 B2 | 8/2011 | Vicari | |
| 8,062,758 B2 | 11/2011 | Rodrigues et al. | |
| 8,354,172 B2 | 1/2013 | Rodrigues | |
| 8,466,243 B2 | 6/2013 | Vicari | |
| 8,524,831 B2 | 9/2013 | Kato et al. | |
| 8,603,730 B2 | 12/2013 | Knocke | |
| 2003/0073778 A1 | 4/2003 | Zhang et al. | |
| 2003/0105197 A1 | 6/2003 | Collins et al. | |
| 2003/0187103 A1 | 10/2003 | Bloom et al. | |
| 2004/0186034 A1 | 9/2004 | Verrall et al. | |
| 2006/0148668 A1 | 7/2006 | Verrall et al. | |
| 2007/0184732 A1 | 8/2007 | Lunsford et al. | |
| 2007/0232771 A1 | 10/2007 | Choi et al. | |
| 2009/0137744 A1 | 5/2009 | Ferguson et al. | |
| 2009/0258953 A1 | 10/2009 | Dobrawa et al. | |
| 2010/0227179 A1 | 9/2010 | Pfeiffer et al. | |
| 2010/0227975 A1 | 9/2010 | Such et al. | |
| 2011/0288229 A1 | 11/2011 | Vicari | |
| 2011/0313105 A1 | 12/2011 | Kato et al. | |
| 2012/0234490 A1 | 9/2012 | Daniels et al. | |

FOREIGN PATENT DOCUMENTS

| | | |
|---|---|---|
| CN | 103193922 A | 7/2013 |
| CN | 103233364 A | 8/2013 |
| DE | 3513046 A1 | 10/1986 |
| EP | 0560264 A1 | 9/1993 |
| EP | 0655464 A2 | 5/1995 |
| EP | 0722813 A2 | 7/1996 |
| EP | 0747456 A2 | 12/1996 |
| EP | 0847405 B1 | 10/2002 |
| EP | 1463765 A4 | 5/2006 |
| EP | 1881998 A4 | 6/2009 |
| EP | 2415789 A1 | 2/2012 |
| GB | 886984 A | 1/1962 |
| GB | 1350282 A | 4/1974 |
| GB | 1438449 A | 6/1976 |
| GB | 1482058 A | 8/1977 |
| JP | 54112985 A | 9/1979 |
| JP | 55137105 A | 10/1980 |
| JP | 56167745 A | 12/1981 |
| JP | 58131902 A | 8/1983 |
| JP | 6366204 A | 3/1988 |
| JP | 63270535 A | 11/1988 |
| JP | 195103 A | 4/1989 |
| JP | 2004269877 A | 9/2004 |
| RU | 2010154355 A | 7/2012 |
| TW | 201211087 A | 3/2012 |
| TW | I412540 B | 10/2013 |
| TW | 201400510 A | 1/2014 |
| TW | 201400511 A | 1/2014 |
| WO | 9209657 A1 | 6/1992 |
| WO | 9708212 A1 | 3/1997 |
| WO | 9825976 A2 | 6/1998 |
| WO | 03055919 A1 | 7/2003 |
| WO | 2006064226 A1 | 6/2006 |
| WO | 2007057344 A1 | 5/2007 |
| WO | 2007111403 A1 | 10/2007 |
| WO | 2007141182 A2 | 12/2007 |

OTHER PUBLICATIONS

Amalvy et al., "Reactive Surfactants in Heterophase Polymerization. 11. Particle Nucleation", Macromolecules, 1998, pp. 5631-5638, vol. 31.
Burgess, "Suspension Polymerisation of Vinyl Chloride", Manufacture and Processing of PVC, Chapter 1, 1982, pp. 1-20.
Clark, "Particle Formation", Particulate Nature of PVC, Chapter 1, 1982, pp. 1-26.
Maruyama et al., "New Modifications of Poly(vinyl alcohol)s and Their Applications", British Polymer Journal, 1988, pp. 345-351, vol. 20.
Kinetics and Mechanisms of Polymerization, Chapter 1-12. Marcel Dekker Inc., 1967, pp. 1-7, vol. 1:1.
Kinetics and Mechanisms of Polymerization, Chapter 4-1, Tables 4-1 and 4-2, Marcel Dekker Inc., 1967, pp. 1-3, vol. 1:1.
Ormondroyd, "The Influence of Poly(vinyl alcohol) Suspending Agents on Suspension Poly(vinyl chloride) Morphology", British Polymer Journal, 1987, pp. 1-12.
Prince, "Water dilutable secondary stabilisers in suspension polymerisation of vinyl chloride monomer", Plastics, Rubber and Composites, 1999, pp. 105-108, vol. 28.
Schoonbrood et al., "Reactive Surfactants in Heterophase Polymerization. 9. Optimum Surfmer Behavior in Emulsion Polymerization", Macromolecules, 1997, pp. 6034-6041, vol. 30.

(56) References Cited

OTHER PUBLICATIONS

Shaw et al., "A PVC Pilot plant and its role in customer support, and the development of novel polyvinyl alcohols.", Proceedings of PVC 2011, Brighton, UK, pp. 499-511.
Visentini et al., "A Study Into the Mechanism of Grafting of Suspending Agents in PVC Polymerisation", Proceedings of PVC 2011, Brighton, UK, pp. 1-4.

\* cited by examiner

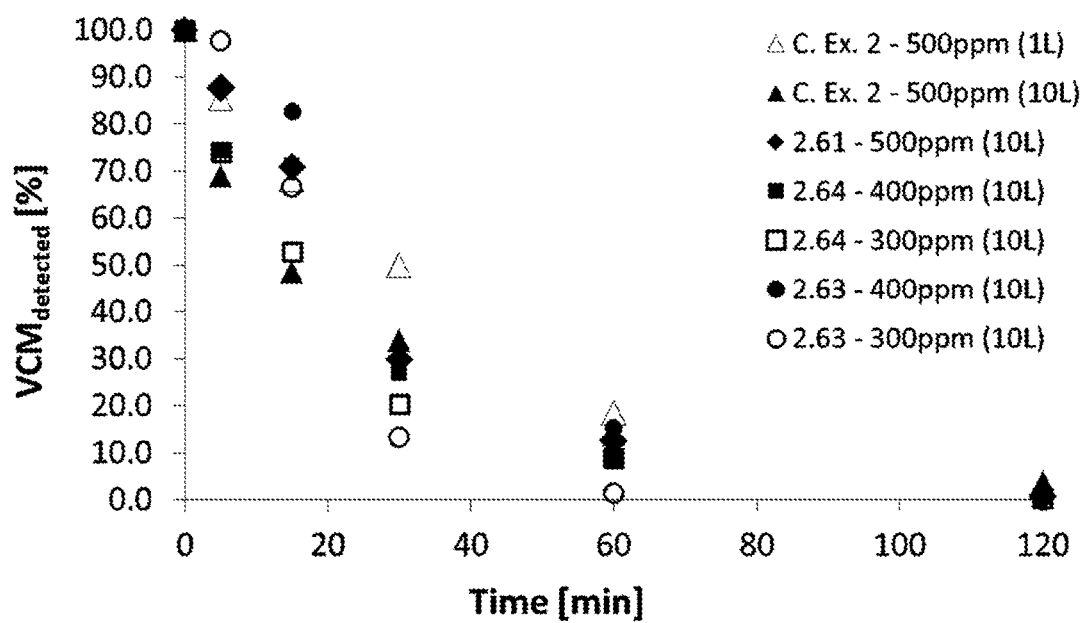

SECONDARY SUSPENDING AGENT FOR SUSPENSION POLYMERISATION REACTION

PRIORITY CLAIM

The present application is a National Phase entry of PCT Application No. PCT/GB2015/050939, filed Mar. 27, 2015, which claims priority from Great Britain Patent Application Number 1405627.9, filed Mar. 28, 2014, and Great Britain Patent Application Number 1421467.0, filed Dec. 3, 2014, the disclosures of which are hereby incorporated by reference herein in their entirety.

FIELD OF THE INVENTION

The present invention concerns a suspending agent for suspension polymerisation reactions. More particularly, but not exclusively, this invention concerns a secondary suspending agent for suspension polymerisation reactions. The invention also concerns use of a polymer as a secondary suspending agent for suspension polymerisation reactions, a suspension polymerisation reaction composition, a method of performing a suspension polymerisation reaction and a polymer for use as a secondary suspending agent for a suspension polymerisation reaction.

BACKGROUND OF THE INVENTION

Primary and secondary suspending reagents are often used in suspension polymerisation reactions, such as the suspension polymerisation of vinyl chloride. The primary suspending agent controls coalescence of the polymer particles, and therefore primarily dictates the size of the polymer particles so formed. The secondary suspending agent typically defines secondary characteristics of the polymer particles, such as particle shape and porosity. Such secondary suspending agents typically comprise partially hydrolysed vinyl acetates (with a typical degree of hydrolysis of 35 to 55 mol %). Production of the partially hydrolysed polyvinyl acetate is a two-step process involving production of the polyvinyl acetate and subsequent partial hydrolysis. There is therefore a desire to be able to create a secondary suspending agent which may function without hydrolysis.

The present invention seeks to mitigate the above-mentioned problems. Alternatively or additionally, the present invention seeks to provide an alternative and/or improved secondary suspending agent for a suspension polymerisation reaction.

SUMMARY OF THE INVENTION

In accordance with a first aspect of the present invention, there is provided a use of a polymer as a secondary suspending agent in a suspension polymerisation reaction, the polymer comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester group, sulfonamide or sulfonyl halide group comprising one polymerisable carbon-carbon double bond per monomer and a sulfonate, sulfonic acid, sulfonic ester, sulfonamide or sulfonyl halide group, the polymer optionally being partially hydrolysed such that a proportion of said ester groups form alcohol groups, the degree of hydrolysis of the polymer being from 0 to 60 mol %.

For the avoidance of doubt, the degree of hydrolysis is calculated from the Residual acetate (RA) value. The Residual acetate value for the polymer is measured by refluxing with a known excess of 0.1N sodium hydroxide solution. A blank determination with no polymer is also carried out. The remaining sodium hydroxide is titrated against 0.1N hydrochloric acid using phenolphthalein indicator. The percentage residual acetate (% RA) in the polymer is calculated using the formula below.

$$\text{Residual Acetate}(\%(w/w)) = \frac{(V_{blank} - V_{Titre}) \times 0.86}{\text{Weight of sample}}$$

The degree of hydrolysis (DH) is calculated using the following equation:

$$\text{Degree of hydrolysis (mol \%)} = 100 \times \frac{1.9545(100 - RA)}{[1.9545(100 - RA)] - RA}$$

The applicant has surprisingly discovered that such a polymer may perform well as a secondary suspending agent, with a low degree of hydrolysis or even no hydrolysis being required.

For the avoidance of doubt, the term "a proportion of said ester groups" includes the situation in which all of the ester groups are hydrolysed.

The method optionally comprises use of an emulsion of a polymer as a secondary suspending agent. Alternatively, the polymer may be made by solution polymerisation.

The polymer may be made by emulsion polymerisation and added to a suspension polymerisation reaction mixture. The polymer may be added as an emulsion. For the avoidance of doubt, it is hereby stated that the polymer may be added as an emulsion, but the emulsion may or may not retain its emulsion character once added to a suspension polymerisation reaction mixture. Alternatively or additionally, the polymer may be made by emulsion polymerisation. The polymer may be added to a suspension polymerisation reaction mixture as a homogenous solution in a solvent, for example, a mixture of water and methanol. Alternatively or additionally, dried particles of polymer may be added to a suspension polymerisation reaction mixture, in which the dried particles may optionally disperse to form an emulsion. The dried particles of polymer may optionally be formed by making the polymer using emulsion polymerisation and then drying the emulsion, thereby forming what are often known as dried emulsions. Alternatively or additionally, the polymer may be dispersed as an emulsion in a solvent optionally using a colloid, for example.

If the polymer is made by emulsion polymerisation, then the polymer optionally comprises a seed. Said seed is typically located inside polymer particles. Optionally the polymer may be made by emulsion polymerisation in the presence of a seed. The use of such seeds in emulsion polymerisation is known to those skilled in the art. Such seeds are used to control particle size and particle size distribution. Such seeds are typically provided in sufficient quantity so that substantially all polymer growth takes place at or around the seeds. The seed optionally comprises a seed polymer. The seed polymer need not be the same as the polymer i.e. the seed polymer need not contain residues of an ester containing monomer and the sulphur-containing monomers mentioned above. The seed should be colloidally-stable in the emulsion used for the emulsion polymerisation. The seed may be pre-synthesised. Alternatively, the seed may be synthesised in situ. For example, the seed may be formed from one or both of the at least one ester-containing monomer and the at least one monomer comprising a sulfonate, sulfonic acid, sulfonic ester, sulfonamide or sulfonyl halide group.

The present invention may therefore provide a use of the aforementioned polymer made by emulsion polymerisation as a secondary suspending agent. The polymer made by emulsion polymerisation may be substantially unhydrolysed.

The polymer may alternatively be made by polymerisation in a dispersed media, or solution or bulk polymerisation.

As mentioned above, the polymer may comprise residues of more than one ester-containing monomer. For example, the polymer may comprise residues of vinyl acetate and methyl methacrylate or vinyl acetate and dimethyl maleate.

The statements below in relation to the ester-containing monomer may apply to one or more monomers used to make the polymer.

The ester-containing monomer optionally comprises a polymerisable C=C group attached to an ester group, optionally via a linker. In general, it is preferred that there is no linker group between the polymerisable C=C group and the ester group. The ester group may, for example, comprise an ester of an alkenoic acid, for example. The ester group may, for example, comprise an ester of an acrylic acid, for example, (meth)acrylic acid. The ester group may, for example, comprise an alkenyl alkanoate.

The ester group may be arranged with the —O— moiety adjacent to the C=C group (as in alkenyl alkanoates, such as vinyl acetate), or with the C=O moiety adjacent to the C=C group (as in alkyl acrylates, such as methyl acrylate and methyl methacrylate).

The C=C group may optionally be substituted at one, two or three positions. For example, each substituent present may optionally be selected from one or more of halo, hydroxy or an optionally substituted $C_1$ to $C_6$ alkyl group.

If the polymer is partially hydrolysed so that at least some of the ester groups are reacted to form alcohols, it is preferred that at least 5%, optionally at least 10%, optionally at least 20%, optionally at least 50%, optionally at least 70%, optionally at least 80%, optionally at least 90% and optionally substantially all of the hydroxyl groups so generated are directly attached to the polymer. This may be achieved using an alkenyl alkanoate monomer, with the —O— moiety directly attached to the C=C group.

The ester-containing monomer optionally comprises one or more of vinyl acetate, vinyl benzoate, vinyl 4-tert-butylbenzoate, vinyl chloroformate, vinyl cinnamate, vinyl decanoate, vinyl neononanoate, vinyl neodecanoate, vinyl pivalate, vinyl propionate, vinyl stearate, vinyl trifluoroacetate, vinyl valerate, methyl vinyl acetate, propenyl acetate, methyl propenyl acetate, ethyl propenyl acetate, butenyl acetate, methyl butenyl acetate, vinyl propanoate, propenyl propanoate, vinyl butyrate, vinyl hexanoate, vinyl heptanoate, vinyl octanoate, vinyl 2-propylheptanoate, vinyl nonanoate, vinyl neononanoate, vinyl trifluoroacetate. For example, one or more of the above-mentioned monomers may be a major monomer in that it provides more than 50 mol % of the ester-containing monomer content. Additionally or alternatively, one or more of the above-mentioned monomers may be a minor monomer in that it provides less than 50 mol % of the ester-containing monomer content.

The ester-containing monomer optionally comprises one or more of esters of (meth)acrylic acid. This may be the case, for example, if the polymer is an emulsion polymer. In general, the preferred alkyl esters of (meth)acrylic acids may be selected from $C_1$-$C_{10}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, 2-ethylhexyl methacrylate, cyclohexyl methacrylate and cetyl methacrylate. Other esters of (meth)acrylic acids include 4-acetoxyphenethyl (meth)acrylate, (meth)acryloyl chloride, 4-(meth)acryloylmorpholine, 2-(4-benzoyl-3-hydroxyphenoxy)ethyl (meth) acrylate, [2-((meth)acryloyloxy)ethyl]trimethylammonium chloride, benzyl 2-propyl (meth)acrylate, sec-butyl methacrylate, tert-butyl (meth)acrylate, 2-[[(butylamino)carbonyl]oxy]ethyl (meth)acrylate, tert-butyl 2-bromo(meth)acrylate, 4-tert-butylcyclohexyl (meth)acrylate, 2-carboxyethyl (meth)acrylate, 2-chloroethyl (meth)acrylate, di(ethylene glycol) ethyl ether (meth)acrylate, di(ethylene glycol) 2-ethylhexyl ether (meth)acrylate, 2-(dimethylamino)ethyl (meth)acrylate, 3-(dimethylamino)propyl (meth)acrylate, dipentaerythritol penta-/hexa-(meth)acrylate, 2-ethoxyethyl (meth)acrylate, methyl acrylate, 2-ethyl(meth)acryloyl chloride, ethyl 2-(bromomethyl) (meth)acrylate, ethyl cis-(β-cyano) (meth)acrylate, ethylene glycol dicyclopentenyl ether (meth)acrylate, ethylene glycol phenyl ether (meth)acrylate, ethyl 2-ethyl(meth)acrylate, ethyl 2-propyl(meth)acrylate, ethyl 2-(trimethylsilylmethyl) (meth)acrylate, 4-hydroxybutyl (meth)acrylate, 2-hydroxyethyl (meth)acrylate, 2-hydroxy-3-phenoxypropyl (meth)acrylate, hydroxypropyl (meth)acrylate, isobornyl (meth)acrylate, isobutyl acrylate, isooctyl methacrylate, lauryl (meth)acrylate, methyl 2-acetamido (meth)acrylate, tetrahydrofurfuryl (meth)acrylate, 3-(trimethoxysilyl)propyl (meth)acrylate, 3,5,5-trimethylhexyl (meth)acrylate, 10-undecenyl (meth)acrylate, maleic acid, maleic anhydride, dimethyl maleate, diethyl maleate, dipropyl maleate, dibutyl maleate, di 2-ethylhexyl maleate (and the corresponding half esters of maleic acid), fumaric acid, dimethyl fumarate, diethyl fumarate, dipropyl fumarate, dibutyl fumarate, di 2-ethyl hexyl fumarate (and the corresponding half esters of fumaric acid), methyl α-bromo (meth)acrylate, methyl 2-(bromomethyl) (meth)acrylate, pentabromobenzyl (meth)acrylate, pentabromophenyl (meth)acrylate, pentafluorophenyl (meth)acrylate, poly(ethylene glycol) acrylate, methyl 2-(chloromethyl) (meth)acrylate, methyl 3-hydroxy-2-methylenebutyrate, methyl 2-(trifluoromethyl) (meth)acrylate, octadecyl (meth)acrylate, and poly(ethylene glycol) methyl ether (meth)acrylate. For example, one or more of the above-mentioned monomers may be a major monomer in that it provides more than 50 mol % of the ester-containing monomer content. Additionally or alternatively, one or more of the above-mentioned monomers may be a minor monomer in that it provides less than 50 mol % of the ester-containing monomer content.

Residues of other monomers may be included as co-monomers, including ethylene, 4-acetoxyphenethyl acrylate, 4-acryloylmorpholine, 2-(4-benzoyl-3-hydroxyphenoxy) ethyl acrylate, [2-(acryloyloxy)ethyl]trimethylammonium chloride, benzyl 2-propylacrylate, butyl acrylate, tert-butyl acrylate, 2-[[(butylamino)carbonyl]oxy]ethyl acrylate, tert-butyl 2-bromoacrylate, 4-tert-butylcyclohexyl acrylate, 2-carboxyethyl acrylate, 2-chloroethyl acrylate, di(ethylene glycol) ethyl ether acrylate, di(ethylene glycol) 2-ethylhexyl ether acrylate, 2-(dimethylamino)ethyl acrylate, 3-(dimethylamino)propyl acrylate, dipentaerythritol penta-/hexa-acrylate, 2-ethoxyethyl acrylate, ethyl acrylate, 2-ethylacryloyl chloride, ethyl 2-(bromomethyl)acrylate, ethyl cis-(β-cyano) acrylate, ethylene glycol dicyclopentenyl ether acrylate, ethylene glycol phenyl ether acrylate, ethyl 2-ethylacrylate, 2-ethylhexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, i methyl acrylate, sobornyl acrylate, isobutyl acrylate, isooctyl acrylate, lauryl acrylate, methyl 2-acetamidoacrylate, tetrahydrofurfuryl acrylate, 3-(trimethoxysilyl)propyl acrylate, 3,5,5-trimethylhexyl acrylate, 10-undecenyl acrylate, methyl methacrylate, maleic acid, maleic anhydride, dimethyl maleate, diethyl maleate, dipropyl maleate, dibutyl maleate, di 2-ethylhexyl maleate (and the corresponding half esters of maleic acid), fumaric acid, dimethyl fumarate, diethyl fumarate, dipropyl fumarate, dibutyl fumarate, di 2-ethyl hexyl fumarate (and the corresponding half esters of fumaric acid), methyl α-bromoacrylate, methyl 2-(bromomethyl)acrylate, pentabromobenzyl acrylate, pentabromophenyl acrylate, pentafluorophenyl acrylate, poly(ethylene glycol) acrylate, methyl 2-(chloromethyl)acrylate, methyl 3-hydroxy-2-methylenebutyrate, methyl 2-(trifluoromethyl)acrylate and octadecyl acrylate, and poly(ethylene glycol) methyl ether (meth)acrylate.

For the avoidance of doubt, it is hereby stated that the term "monomer" applies to oligomers and polymers that comprise a polymerisable carbon-carbon double bond. Such oligomers comprise fewer than five repeat units, whereas polymers comprise five or more repeat units.

As mentioned above, the polymer optionally comprises residues from more than one monomer comprising a sulfonate, sulfonic acid, sulfonic ester, sulfonamide or sulfonyl halide group.

The statements below in relation to the monomer comprising a sulfonate, sulfonic acid, sulfonic ester, sulfonamide or sulfonyl halide group may apply to one or more such monomers used to make the polymer.

The monomer comprising a sulfonate, sulfonic acid or sulfonic ester, sulfonamide or sulfonyl halide group typically comprises a polymerisable C=C group attached to a sulfonate ($SO_3^-$) group (optionally provided as a salt, such as a sodium salt), a sulfonic acid (—$SO_3H$) group, a sulfonic ester (—$SO_3R$, where R is any suitable group and may, for example, be optionally substituted alkyl, aryl or alkenyl), a sulfonamide (primary, secondary or tertiary) or a sulfonyl halide (—$SO_3X$, where X is halogen), optionally via a linker. In general, it is preferred that there is a linker group, such as an alkylene linker (optionally substituted and optionally branched), the alkylene linker optionally comprising a C1-C6 alkylene group, such as a methylene linker group between the polymerisable C=C group and the sulfonate, sulfonic acid, sulfonic ester, sulfonamide or sulfonyl halide group.

The linker group may comprise a chain of up to 10 atoms, optionally up to 8 atoms and optionally up to 5 atoms. The linker group optionally comprises one or more ether and/or secondary or tertiary amino groups. The linker group is optionally substituted, optionally with one or more alkyl, halo or hydroxyl groups.

Examples of monomers comprising sulfonate, sulfonic acid, sulfonic ester, sulfonamide or sulfonyl halide groups include sodium vinyl sulfonate, sodium (meth)allyl sulfonate, sodium allyl sulfonate, 2-methyl-2-propene-1-sulfonic acid sodium salt and 2-acrylamido-2-methylpropane sulfonic acid sodium salt, 3-sulfopropyl (meth)acrylate, sodium α-methylstyrene sulfonate, sodium ethyl styrene sulfonate, sodium 1-allyloxy-2-hydroxypropyl sulfonate. Likewise, linear or branched $C_1$-$C_{10}$-alkylsulfonamides of acrylic acid or of methacrylic acid are suitable. Also suitable are ω-alkene-1-sulfonic acids having 2 to 10 C atoms. Other examples include, vinylsulfonic acid, allylsulfonic acid, methallylsulfonic acid, 2-methacrylamido-2-methylpropanesulfonic acid, 2-acrylamidoethanesulfonic acid, 2-acryloyloxyethanesulfonic acid, 2-methacryloyloxyethanesulfonic acid, 3-acryloyloxypropanesulfonic acid, 2,2-ethylhexylaminoethane sulfonic acid and 2-methacryloyloxypropanesulfonic acid, Sodium 4-vinylbenzenesulfonate and salts and esters thereof.

The C=C group may optionally be substituted at one, two or three positions. For example, each substituent present may optionally be selected from one or more of halo, hydroxy or an optionally substituted $C_1$ to $C_6$ alkyl group.

The copolymer may comprise up to 10 mol %, optionally up to 7 mol %, optionally up to 5 mol %, optionally up to 3 mol %, optionally up to 2 mol %, optionally up to 1 mol %, optionally at least 0.1 mol %, optionally at least 1 mol %, optionally at least 1.5 mol %, optionally from 1 mol % to 10 mol %, optionally from 1 mol % to 7 mol %, optionally from 2 mol % to 7 mol %, optionally from 2 mol % to 5 mol %, optionally from 0.1 to 2 mol % and optionally from 0.1 to 1.5 mol % of residues of the one or more monomers comprising a sulfonate, sulfonic acid, sulfonic ester, sulfonamide or sulfonyl halide group, based on the residue content of the one or more ester-containing monomers.

The copolymer optionally comprises residues of monomers which are not residues of the at least one ester-containing monomer and residues of the at least one monomer comprising a sulfonate, sulfonic acid, sulfonic ester, sulfonamide or sulfonyl halide. For example, the copolymer optionally comprises residues of vinyl or vinyl aromatic monomers, such as ethylene, styrene, alpha-methyl styrene, p-methyl styrene, t-butyl styrene or vinyl toluene. The copolymer may also comprise residues of one or more of a solvent, chain transfer agent and an initiator.

The copolymer optionally comprises at least 90% (optionally at least 95% and optionally at least 98%) by weight of residues of the at one least one ester-containing monomer and residues of the at least one monomer comprising a sulfonate, sulfonic acid, sulfonic ester, sulfonamide or sulfonyl halide group, optionally some of the ester residues being hydrolysed to provide a degree of hydrolysis of up to 60 mol %, the remainder of the polymer being provided by other residues not being residues of the at one least one ester-containing monomer and residues of the at least one monomer comprising a sulfonate, sulfonic acid, sulfonic ester, sulfonamide or sulfonyl halide such as residues of solvent, chain transfer agent and initiator.

The polymer may comprise one or more residues of one or more monomers of formula (1) below in addition to, or instead of, the residue(s) of said at least one monomer comprising a sulfonate, sulfonic acid, sulfonic ester group, sulfonamide or sulfonyl halide group Formula (1)

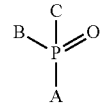

Where at least one of A, B and C comprises at least one (and optionally only one) polymerisable carbon-carbon double bond, and Where at least one of A, B and C comprises —OH or a salt or ester thereof.

For the avoidance of doubt, in Formula (1) P is phosphorous and O is oxygen.

Optionally, two of A, B and C comprise —OH or a salt or ester thereof, in which case said two of A, B and C may be the same or different.

Optionally, two of A, B and C may comprise at least one (and optionally only one) polymerisable carbon-carbon double bond, in which case said two of A, B and C may be the same or different.

Said ester of the —OH group may, for example, comprise an alkyl ester.

The group(s) comprising at least one (and optionally only one) polymerisable carbon-carbon double bond may comprise an acrylic acid group (or ester or salt thereof), an acrylamide group (or derivative thereof) or may comprise a vinyl or allyl group, for instance.

The monomer(s) comprising at least one phosphonic acid group (or salt or ester thereof) may optionally be selected from the group consisting of vinylphosphonic acid (and methyl ester),2-propene phosphonic acid (and diethyl ester), phosphoric acid 2-hydroxyethyl (meth)acrylate ester, 2-(methacryloyloxy) ethyl phosphate, α-(dialkylphosphonate) acrylate, β-(dialkylphosphonate) acrylate,dialkylphosphonate (meth)acrylate, N-(dialkylphosphonate) (meth) acrylamide, dimethyl (methacryloyloxy) methyl phosphonate, dialkyl vinyl phosphonates (such as dimethyl vinyl phosphonate, diethyl vinyl phosphonate, diisopropyl vinyl phosphonate), allylphosphonic acid & allylphosphonic acid monoammonium salt, dimethyl-1-allyloxymethylphosphonate, dialkyl vinyl ether phosphonates (such as 2-vinyloxyethyl phosponate), diethyl 2-butenylphosphonate, bis(2-methacryloxyethyl)phosphate, phosphate esters of polyethylene glycol monomethacrylate, phosphate esters of polypropylene glycol mono(meth)acrylate, para-vinylbenzyl phosphonate, diethylbenzyl phosphonate, and salts and esters thereof.

For example, the polymer may comprise residues of one or more monomers of Formula (1), and substantially no residues of said at least one monomer comprising a sulfonate, sulfonic acid, sulfonic ester group, sulfonamide or sulfonyl halide group.

In one embodiment, the copolymer is not hydrolysed to any significant degree. In this case, the degree of hydrolysis is optionally no more than 10 mol %, optionally no more than 5 mol % and optionally substantially nil. The applicant has discovered that surprisingly the unhydrolysed copolymer can perform well as a secondary stabilising agent in the suspension polymerisation of vinyl compounds. This is particularly the case when the polymer is provided as an emulsion.

If the copolymer is hydrolysed, the degree of hydrolysis may optionally be lower than 60 mol %, optionally from 10 to 50 mol %, optionally from 10-50 mol %, optionally from 10-45 mol % and optionally from 10-40 mol %. The degree of hydrolysis may optionally be from 10-30 mol %. Therefore, the degree of hydrolysis of the polymer may therefore be from 0 to 30 mol %.

The polymer is optionally essentially a linear polymer.

Alternatively, the polymer may be a branched polymer. Therefore, the copolymer may comprise residues of one or more polyunsaturated monomer, each comprising a plurality of polymerisable unsaturated groups, such as C═C groups. Said monomers may lead to the incorporation of branching into the polymer.

At least one (optionally each) polyunsaturated monomer may comprise any monomer which can be polymerised by a free radical mechanism. The term "monomer" also includes suitably reactive oligomers (typically comprising fewer than 5 repeat units), or polymers (typically comprising 5 or more repeat units).

One or more (and optionally each) of the carbon-carbon double bonds (if present) of at least one (and optionally each) polyunsaturated monomer may be an ethylenic carbon-carbon double bond.

At least one polyunsaturated monomer optionally comprises at least two (and optionally at least three) polymerisable (optionally carbon-carbon) double bonds per molecule.

At least one polyunsaturated monomer may comprise a bi-unsaturated monomer i.e. comprises two, and no more than two, polymerisable (optionally C—C) double bonds. Examples of suitable bi-unsaturated monomers include di(meth)acrylate or diallyl compounds, such as diacrylates and di(meth)acrylates, such as ethylene glycol di (meth) acrylate, hexanediol di (meth) acrylate, tripropylene glycol di (meth) acrylate, butanediol di (meth) acrylate, neopentyl glycol di (meth) acrylate, diethylene glycol di (meth) acrylate, triethylene glycol di (meth) acrylate, dipropylene glycol di (meth) acrylate and vinyl acrylates, such as allyl (meth) acrylate, butadiene, diallyl succinate, diallyl carbonate, diallyl phthalate and substituted analogues thereof.

For example, at least one polyunsaturated monomer may be a tri-unsaturated monomer i.e. comprises three, and no more than three, polymerisable (optionally C—C) double bonds.

Tri-unsaturated monomers include: tripropylene glycol tri (meth) acrylate, trimethylol propane tri (meth)acrylate, pentaerythritol tri (meth)acrylate, 1,3,5-triallyl-1,3,5-triazine-2, 4,6(1H,3H,5H)-trione ("TTT"), or diallyl maleate.

At least one polyunsaturated monomer may comprise a tetra-unsaturated monomer which comprises four (and only four) polymerisable (optionally C—C) double bonds. Examples of tetra-unsaturated monomers are pentaerythritol tetra (meth) acrylate.

At least one polyunsaturated monomer may comprise a penta-unsaturated monomer which comprises five (and only five) polymerisable (optionally C—C) double bonds. Examples of penta-unsaturated monomers include: glucose penta(meth)acrylate.

The polymer may optionally comprise residues of one or more chain transfer agents. Such chain transfer agents may be used to control polymer weight. The one or more chain transfer agents may comprise a thiol, an alcohol or a carbonyl containing moiety. The thiol may comprise N-dodecyl mercaptan, tertiary-dodecyl mercaptan, tert-nonyl mercaptan, pentaerythritol tetrakis (2-mercaptoacetate) or pentaerythritol tetrakis (3-mercaptoprionate), for example. The chain transfer agent may comprise an alcohol, such as methanol, ethanonl, iso-propyl alcohol, butanol or the chain transfer agent may comprise a carbonyl containing compound, such as an acetaldehyde, propionaldehyde, butyl aldehyde, pentanaldehyde, hexyl aldehyde, benzyl aldehyde, acetone, methyl ethyl ketone. Other suitable chain transfer agents may be found in Kinetics and Mechanisms of Polymerization, Volume 1, part 1, Chapter 1-12 and Chapter 4-2 Part C, 1967, Marcel Dekker Inc., for example.

The amount of chain transfer agent used in the process to produce the polymer will depend very much on the efficiency of the chain transfer agent. Efficient chain transfer agents (such as thiols) may typically be provided in much smaller amounts than less efficient chain transfer agents (such as iso-propyl alcohol).

The polymer may optionally comprise residues of one or more polymerisation initiator. Such initiators are capable of generating free radicals. The initiator may, for example, comprise an azo initiator, such as azobis (isobutyronitrile) (AIBN), azobis (2-methylbutyronitrile), azobis (2,4-dimethylvaleronitrile), azobis (4-cyanovaleric acid) or an oxidizing agent, such as a persulfate (such as potassium persulfate, sodium persulfate or ammonium persulfate), hydrogen peroxide, teriary butyl hydrogen peroxide, or an oil soluble peroxy ester such as dilauryl peroxide, or tert-butyl peroxyneodecanoate, dibenzoyl peroxide, dicumyl peroxide, tert-butyl peroxy-2-ethyl hexanoate, tert-butyl peroxy diethyl acetate and tert-butyl peroxy benzoate, a peroxydicarbonate such as di(n-propyl)peroxydicarbonate Di(2-ethylhexyl) peroxy dicarbonate or di (4-teriary-butyl cyclohexyl) perdicarbonate, or a redox couple such as a peroxide in combination with reducing agent, such as hydrogen peroxide and sodium formaldehyde sulfoxylate or sodium dithionite or sodium metabisulfite or ascorbic acid, further examples of redox initiators may be found in US2007/0184732, in particular in paragraph [0043] or a combination of initiators. Examples of photoinitiator systems may be found in U.S. Pat. No. 8,603,730, in particular in the text bridging cols. 6 and 7. Optionally, the initiator may comprise a system which is capable of generating a controlled radical polymerisation, such as RAFT, ATRP or NMP.

The number average molecular weight, $M_n$, is optionally no more than 300,000, optionally no more than 150,000, optionally no more than 50,000 optionally no more than 10,000 and optionally no more than 5,000. The number average molecular weight may be at least 1,000 and optionally at least 2,000. The number average molecular weight is optionally from 1,200 to 200,000, optionally from 1,400 to 150,000 and optionally from 1,500 to 120,000 g/mol.

The weight average molecular weight, $M_w$, is optionally no more than 2,000,000, optionally no more than 500,000, optionally no more than 100,000, optionally no more than 50,000 and optionally no more than 25,000. The weight average molecular weight may be at least 5000, optionally at least 10,000 and optionally at least 15,000. The weight average molecular weight is optionally from 5,000 to 50,000, optionally from 5,000 to 40,000, optionally from 8,000 to 40,000 and optionally from 10,000 to 30,000 g/mol.

The molecular weights, $M_w$, and $M_n$, mentioned above were measured by size exclusion chromatography (SEC) (also known as gel permeation chromatography, GPC) in THF solution. The sample was injected into a PL-GPC-50® system via autosampler, using stabilised THF as a mobile phase and three PL gel® columns in series, each column having dimensions of 300 mm×7.5 mm×10 µm. The system was calibrated with polystyrene standards, PS High Easivials supplied by Agilent Technologies, in the Mp molecular weight range of 6,035,000-580 g/mol. Samples for GPC analysis were prepared by drying the solution or emulsion in a dessicant box at 20° C., then 0.1 g of dried polymer was dissolved in 20 mL of tetrahydrofuran (THF).

Solution viscosity measurements on samples of the dried polymer obtained by solution or emulsion polymerisation were made to determine the K-value. In this case, the K-value measurements were performed using a 2% (w/v) solution of the polymer in a suitable solvent (typically methanol or ethyl acetate) in a "C" U-tube viscometer equilibrated at 20±0.2° C. in a water bath. The time for the equilibrated solution to flow between 2 marks on the capillary was used to calculate the relative solution viscosity $\eta_r$.

$$\eta_r = \frac{\text{recorded flow time of the } 2\%(w/v) \text{ solution}}{\text{recorded flow time of solvent}}$$

The K value was then derived from the following formula:

$$\log \eta_r = \left[ k + \frac{75 \times k^2}{1 + 1.5 \times k \times c} \right] \times c$$

In which c=concentration of the polymer in g/100 mL solution. The dried sample of polymer was prepared by drying the sample of solution or emulsion (optionally solubilised using methanol) under an air flow at 20° C.

The K-value (K-v) of the polymer is optionally from 20 to 90, optionally from 25 to 85, optionally from 30 to 80, optionally from 30 to 40 and optionally from 70 to 80.

The polymer may comprise one or more coagulation inhibitors. The one or more coagulation inhibitors may comprise one or more of one or more surfactants and one or more water-soluble polymers, often known to those skilled in the art as "colloids". The coagulation inhibitors inhibit coalescence of particles of polymer, and stabilise the emulsion.

Optionally, the surfactant may be anionic, non-ionic or cationic.

The surfactant may optionally be used in amounts of from 0 to 20 wt %, preferably from 0 to 10 wt %, more preferably from 0 to 5 wt %, parts by weight, based on the total weight of the monomers (i.e. the ester-containing monomer(s) and the monomer(s) comprising a sulfonate, sulfonic acid, sulfonic ester, sulfonamide or sulfonyl halide group). The amount of surfactant optionally comprises from 0.1 wt %, optionally from 0.5 wt % and optionally from 1 wt %, based on the total weights of the monomers as defined above. The amount of surfactant optionally comprises up to 2 wt %, optionally up to 3 wt %, optionally up to 5 wt %, optionally up to 10 wt %, based on the total weight of the monomer. The polymer may be synthesised without surfactants.

One or more colloids can also be used instead of, or in addition to, one or more surfactants. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The one or more colloids may comprise polyvinyl alcohols. In general, these protective colloids are used in contents of from 0 to 10 wt %, optionally from 0 to 5 wt %, based on the total weight of the monomers, as defined above. The amount of colloid optionally comprises from 0.1 wt %, optionally from 0.5 wt % and optionally from 1 wt %, based on the total weights of the monomers as defined above. The amount of surfactant optionally comprises up to 2 wt %, optionally up to 3 wt %, optionally up to 5 wt %, optionally up to 10 wt %, and optionally up to 20 wt % based on the total weight of the monomer. The polymer may be synthesised without colloids.

It has been found that the polymer mentioned above may be successfully used as a secondary suspending agent in a suspension polymerisation reaction, even if not hydrolysed. By omitting the hydrolysis stage, less vinyl acetate is required per tonne of final product produced. That is, it is a much more atom efficient process than the conventional process for producing a partially hydrolysed polyvinyl acetate secondary suspending agent through a hydrolysis process.

The polymer may exist in the form of an emulsion. The polymer particle size is optionally at 40 nm to 1000 nm, optionally 100 nm to 800 nm and optionally 200 nm to 600 nm.

Particle size may be measured using any suitable technique, but is typically measured using the intensity-average diameters of the emulsion particles, which were measured by dynamic light scattering (DLS) at a temperature of 25° C. using a Zetasizer Nano-S® from Malvern Instruments Ltd using the Zetasizer 6.2® software. The instrument was calibrated with a standard polystyrene latex in water exhibiting a particle size of 220±6 nm, supplied by Malvern Instruments Ltd. Before the measurements, the samples were diluted with deionized water.

The emulsion, when initially made, optionally has a total solid content of at least 5%, optionally at least 15%, optionally at least 35%, optionally no more than 70% optionally no more than 65% and optionally no more than 60%. The emulsion is optionally diluted before being added to the suspension polymerisation reagents.

Optionally, the emulsion when made may be concentrated by the removal of volatile components. Optionally the emulsion may be freed from water by any of the known processes known in the state of the art such as spray drying or coagulation using salts and subsequent filtration. Optionally the dried polymer may be provided with a free flow agent such as calcium carbonate or silica to prevent "blocking" of the dry powder.

Optionally the emulsion may be added directly to the polymerisation reactor in the form in which it was initially made, or it may be diluted with process water prior to addition or it may be diluted by any of the aqueous reagent streams to the reactor, for example by the primary suspending agent solution. Optionally the dried emulsion may be added directly to the reactor as a solid material, optionally the dried emulsion powder may be added to one of the process streams for example the primary suspending agent solution or it may be re-constituted as an emulsion and added to the reactor, optionally by incorporation in to the primary suspending agent solution.

The pH of the emulsion, when initially made, may optionally be no more than 9, optionally no more than 7.5, optionally no more than 6.5, optionally from 4 to 6 and optionally from 1 to 2. The pH of the diluted emulsion (as is added to the suspension polymerisation reagents) will depend accordingly on the dilution of the emulsion. The emulsion optionally comprises one or more buffers. The buffer keeps the pH in a desired range (for example, from 4 to 6), which may inhibit reduction of the pH to levels at which unwanted hydrolysis of the polymer takes place.

The viscosity of the emulsion is less than 50 Ps, optionally no more than 30 Ps, typically less than 5 Ps, typically less than 1 Ps. The viscosity is measured using a Brookfield DV-I™ Viscometer, spindle 1 at 20° C. and 20 rpm.

A suspension polymerisation reaction is well-known to those skilled in the art, and is as defined by IUPAC. Suspension polymerisation is polymerisation in which polymer is formed in monomer or monomer-solvent droplets in a continuous phase that is a non-solvent for both the monomer and the polymer formed. Furthermore, the droplets have mean diameters exceeding 1 micron, typically exceeding 5 microns and optionally exceeding 10 microns. This definition is to be found in Pure Appl Chem, vol. 83, no. 12, pp 2229-2259, September 2011, "Terminology of polymers and polymerisation in dispersed phases (IUPAC Recommendations 2011)". Likewise, those skilled in the art will understand the term "secondary suspending agent". For the avoidance of doubt, secondary suspending agents are described in Ullmann's Encyclopedia of Industrial Chemistry, 5$^{th}$ Edition, vol. A21, pages 717-742, 1992, VCH Publishers Inc, in particular, pages 721-723. For the avoidance of doubt, the above-mentioned reference refers to "secondary protective colloids", instead of "secondary suspending agent". The teaching of the above-mentioned reference in relation to "secondary protective colloids" is incorporated herein by reference. Secondary suspending agents are also known as secondary stabilisers.

In accordance with a second aspect of the present invention, there is provided a secondary suspending agent composition for suspension polymerisation of a vinyl compound, the composition comprising a solution or an emulsion of a copolymer comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester, sulfonamide or sulfonyl halide group comprising one polymerisable carbon-carbon double bond per monomer and a sulfonate, sulfonic acid, sulfonic ester, sulfonamide or sulfonyl chloride group, the polymer optionally being partially hydrolysed such that a proportion of said ester groups form alcohol groups, the degree of hydrolysis of the polymer being from 0 to 60 mol %.

The polymer used in the secondary suspending agent composition of the second aspect of the present invention may comprise those features described above in relation to the use of the polymer of the first aspect of the present invention. Likewise, the emulsion used may comprise those features described above in relation to the first aspect of the present invention. For example, the polymer may be made by emulsion polymerisation. If the polymer is made by emulsion polymerisation, then the polymer may comprise a seed.

In accordance with a third aspect of the present invention, there is provided a suspension polymerisation reaction composition comprising;

A continuous phase in which is dispersed droplets of one or more monomers to be polymerised;

One or more primary suspending agents; and

At least one secondary suspending agent comprising a copolymer (optionally an emulsion of a copolymer) of (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester, sulfonamide or sulfonyl halide group comprising one polymerisable carbon-carbon double bond per monomer and a sulfonate, sulfonic acid, sulfonic ester, sulfonamide or sulfonyl halide group, the polymer optionally being partially hydrolysed such that a proportion of said ester groups form alcohol groups, the degree of hydrolysis of the polymer being from 0 to 60 mol %.

The copolymer may have those features described above in relation to the use of a polymer in accordance with the first aspect of the present invention. For example, the polymer may be made by emulsion polymerisation.

The one or more monomers to be polymerised may comprise a monomer comprising a polymerisable vinyl (C═C) group and optionally one or more co-monomers. For example, the monomer may comprise one or more of a vinyl halide (such as vinyl chloride or vinylidene chloride), an alkenyl alkanoate (such as vinyl acetate), an alkyl acrylate (such as ethyl acrylate, butyl acrylate or 2-ethylhexyl acrylate), an alkyl methacrylate (such as methyl methacrylate)or acrylonitrile. The co-monomer if present is typically provided in a smaller amount than the "main" monomer. The copolymers may have a statistical or a blocky distribution of monomer units along the polymer chain. Preferably, the poly(vinyl chloride) is selected from a poly(vinyl chloride) homopolymer and copolymers with vinyl acetate, acrylonitrile and/or an alkyl (meth)acrylate such as vinyl chloride/vinyl acetate copolymer. For example, in the production of PVC, vinyl chloride is provided in greater amounts than the copolymers which may comprise, for example, vinyl acetate and vinyl alcohol.

The primary suspending agent may optionally comprise one or more polyvinyl acetates, typically having a degree of hydrolysis of about 70-90 mol % (the suspending agent therefore being a poly(vinyl acetate)-co-poly(vinyl alcohol)), and are also known as partially hydrolysed polyvinyl acetate or polyvinyl alcohols. The primary suspending agent may comprise more than one component. Optionally, the primary suspending agent may comprise a cellulosic polymer, such as hydroxypropyl methyl cellulose or hydroxyethyl cellulose for example. Specific examples of primary suspending agents are listed in Ullmann's Encyclopedia of Industrial Chemistry, 5th Edition, 1992, page 722, Table 3, the teaching of which is incorporated herein by reference. The primary suspending agent may comprise one or more cellulose-based polymers. The primary suspending agent may comprise one or more polyvinyl alcohols and one or more cellulose-based polymers. The amount of the one or more polyvinyl alcohols is typically greater than the amount of the one or more cellulose-based polymers.

The monomer to be polymerised may be polymerisable using free radical polymerisation, and therefore the reaction composition may be suitable for free radical polymerisation. The polymerisation process may be an addition polymerisation process. The polymerisation process may be a controlled living radical process.

The composition optionally comprises one or more initiators and one or more further secondary suspending agents. The continuous phase is typically aqueous.

The composition optionally comprises 100 parts by weight of the one or more monomers to be polymerised, 85 to 130 parts by weight (e.g. 90 to 130 parts by weight) of continuous phase (e.g. water), 0.04 to 0.22 parts by weight (e.g. 0.05 to 0.15 parts by weight) of primary suspending agent, 0.001 to 0.20 parts by weight of said secondary suspending agent comprising said polymer, and 0.03 to 0.15 parts by weight (e.g. 0.03 to 0.12 parts by weight, or 0.03 to 0.10 parts by weight) of initiator.

In order to improve the morphology of the poly(vinyl chloride) grains obtained further additives can be added, such as one or more of:
one or more further secondary suspending agents, one or more tertiary suspending agents, one or more buffers, oxygen, one or more chain-transfer or chain-extending agents, and one or more chain-terminators, one or more antioxidants, and one or more build up suppressants. The main function of the primary protective colloids is to control the grain size but they also affect porosity and other morphological properties. Furthermore additional quantities of the Primary suspending agent or another polyvinyl alcohol may be added during the polymerisation to enhance bulk density, optionally to control foam and prevent poor thermal history in the resin.

A range of free radical initiators soluble in the monomer(s) can be used, including diacetyl peroxides, peroxydicarbonates, and alkyl peroxyesters as well as azo initiators and benzoyl peroxide. Mixtures of different initiators can also be used. Specific examples of initiators are listed in Ullmann's Encyclopedia of Industrial Chemistry, 5th Edition, 1992, page 723, Table 4, the teaching of which is incorporated herein by reference.

The composition optionally, comprises a greater weight of primary suspending agent than secondary suspending agent. The composition optionally comprises a greater weight of secondary suspending agent than primary suspending agent.

The weight of the primary suspending agent used in the composition is optionally at least 0.5 times, optionally at least 1.0 times, optionally at least 1.2 times, optionally at least 1.5 times, optionally at least 1.8 times and optionally at least 2.0 times, optionally at least 5.0 times, optionally at least 10 times, optionally at least 20 times, optionally at least 30 times, optionally at least 50 times and optionally at least 90 times the weight of the second suspending agent used.

The composition optionally comprises 20 to 2000 ppm of said secondary suspending agent relative to the weight of said one or more monomers to be polymerised, optionally from 50 to 1000 ppm, optionally from 100 to 800 ppm, optionally from 100 to 600 ppm and optionally from 200 to 500 ppm. The ppm amounts calculated are based on the solid content of the polymer.

The composition optionally comprises one or more initiators. A range of free radical initiators soluble in the monomer(s) can be used in suspension and mass polymerisation, including diacetyl peroxides, peroxydicarbonates, and alkyl peroxyesters as well as azo initiators and benzoyl peroxide. Mixtures of different initiators can also be used. Specific examples of initiators are listed in Ullmann's Encyclopedia of Industrial Chemistry, 5th Edition, 1992, page 723, Table 4, the teaching of which is incorporated by reference.

As mentioned above, the one or more monomers to be polymerised optionally comprises vinyl chloride and optionally a copolymer. Within this application, the term "poly (vinyl chloride)" includes homopolymers of vinyl chloride as well as copolymers of vinyl chloride with up to 60% by weight, typically up to 30% by weight, preferably up to 20% by weight, more preferably up to 17% by weight (based on total weight of monomers) of one or more comonomers. Typically, the comonomer is selected from vinylidene chloride, vinyl acetate, methyl (meth)acrylate, ethyl (meth)acrylate, propyl (meth)acrylate, butyl (meth)acrylate, t-butyl (meth)acrylate, 2-ethyl hexyl (meth)acrylate, hydroxyalkyl acrylate, (meth)acrylic acid, (meth)acrylonitrile, vinyl isobutyl ether, vinyl fluoride, vinylidene fluoride, maleic anhydride and esters thereof, ethylene, propylene, styrene and butadiene and mixtures thereof. The copolymers may have a statistical or a blocky distribution of monomer units along the polymer chain. Preferably, the poly(vinyl chloride) is selected from a poly(vinyl chloride) homopolymer and copolymers with vinyl acetate, acrylonitrile and/or an alkyl (meth)acrylate such as vinyl chloride/vinyl acetate copolymer, typically comprising 83 to 93% by weight of polymerized vinyl chloride units and 17 to 7% by weight of polymerized vinyl acetate units; vinyl chloride/acrylonitrile copolymer, typically comprising 40 to 75% by weight of polymerized vinyl chloride units and 25 to 60% by weight of polymerized acrylonitrile units; and vinyl chloride/alkyl (meth)acrylate copolymer, typically comprising 98 to 75% by weight of polymerized vinyl chloride units and 2 to 25% by weight of polymerized alkyl (meth)acrylate units. Most preferably, the poly(vinyl chloride) is poly(vinyl chloride) homopolymer.

In accordance with a fourth aspect of the present invention, there is provided a method of making a polymer using suspension polymerisation, the method comprising:

Polymerising one or more monomers in the presence of a secondary suspending agent comprising a copolymer (and optionally an emulsion of a copolymer) comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester, sulfonamide or sulfonyl halide group comprising one polymerisable carbon-carbon double bond per monomer and a sulfonate, sulfonic acid, sulfonic ester, sulfonamide or sulfonyl halide group, the polymer optionally being partially hydrolysed such that a proportion of said ester groups form alcohol groups, the degree of hydrolysis of the polymer being from 0 to 60 mol %.

The method may comprise polymerising one or more monomers in the presence of one or more primary suspending agents.

The method may comprise polymerising one or more monomers in the presence of one or more initiators.

The method may comprise polymerising one or more monomers in the presence of one or more of:
one or more further secondary suspending agents, one or more tertiary suspending agents, one or more buffers, oxygen, one or more chain-transfer or chain-extending agents, and one or more chain-terminators, one or more antioxidants, and one or more build up suppressants.

Said secondary suspending agent(s) may have the properties and features described above in relation to the use of the first aspect of the present invention, and the compositions of the second and third aspects of the present invention.

The method optionally comprises providing an initial charge to a reactor comprising a liquid forming the continuous phase (typically water), optionally said secondary suspending agent and optionally one or more first suspending agents. The one or more monomers to be polymerised are then added to the initial charge.

Optionally, at least some of the primary suspending agent and optionally at least some of the secondary suspending agent may be added simultaneously with the one or more monomers to be polymerised, optionally into a pre-heated reactor containing some or all of the liquid which forms the continuous phase. Optionally, one or more initiators are then charged to the reactor. Typically, the reactor inside wall may have been coated with a build-up suppressant to prevent adhesion of the poly(vinyl chloride) to the walls, agitator, cooling cage(if present) and baffles (if present). Optionally, at least some of the initiator may be added together with the water and one or more primary suspending agents or following the introduction of the one or more monomers to be polymerised. After or during charging the reactor contents are typically heated to a temperature of 40 to 75° C. which may cause some of the initiator to decompose.

In certain cases, the reaction is strongly exothermic reaction, in which case the temperature may be controlled by adding more continuous phase liquid (optionally with more primary and/or secondary suspending agents), or removing heat, for example by using a jacket, an internal coil or a condenser. Stirring is typically continued throughout the reaction. At a conversion of typically 80 to 95% such as 80 to 90% the reaction is terminated, typically at a predetermined pressure, usually by adding a chain terminator and/or venting off the unreacted monomer.

The method of the fourth aspect of the present invention may comprise forming a reaction composition in accordance with the third aspect of the present invention.

In accordance with a fifth aspect of the present invention, there is provided a polymer (optionally made by emulsion polymerisation) as defined in relation to the use as a secondary suspending agent in the first aspect of the present invention. The polymer may have those features as described above in relation to the use of the first aspect of the present invention.

It will of course be appreciated that features described in relation to one aspect of the present invention may be incorporated into other aspects of the present invention. For example, the method of the fourth aspect of the present invention may incorporate any of the features described with reference to the use of the first aspect of the present invention and vice versa.

The invention will now be described by way of example only, by reference to FIG. 1, firstly (in Part 1) with reference to polymers made by solution polymerisation and secondly (in Part 2) with reference to polymers made by emulsion polymerisation.

BRIEF DESCRIPTION OF THE FIGURE

The Figure shows how the vinyl chloride monomer (VCM) (%) varies as a function of time for polyvinyl chloride polymers made using examples of polyvinyl acetates/alcohols in accordance with embodiments of the present invention.

Part 1—Polymers Made by Solution Polymerisation
1.A—Co-polymers of Vinyl Acetate and 2-methyl-2-propene-1-sulfonic Acid Sodium Salt

TABLE 1.A

| | materials | | | |
|---|---|---|---|---|
| Product | Name | Mw [g/mol] | Purity [%] | CAS n° |
| IPA | Isopropanol | 60.10 | ≥99 | 67-63-0 |
| MeOH | Methanol | 32.10 | ≥99 | 67-56-1 |
| NaMPSA | 2-Methyl-2-propene-1-sulfonic acid sodium salt | 158.15 | 98% | 1561-92-8 |
| TBPEH | t-Butyl peroxy-2-ethylhexanoate | 216.30 | ≥99 | 3006-82-4 |
| VAc | Vinyl Acetate | 86.10 | ≥99 | 108-05-4 |

Co-polymers of vinyl acetate ("VAc") and a sulfonate monomer, 2-methyl-2-propene-1-sulfonic acid sodium salt ("NaMPSA"), were synthesised using the method shown in Table 1.1. MeOH is methanol, IPA is isopropyl alcohol and TBPEH is an organic peroxide initiator, t-Butyl peroxy-2-ethylhexanoate.

Briefly, in an initial phase, NaMPSA, methanol, isopropyl alcohol and vinyl acetate were loaded into the reactor (a 1 liter volume reactor), the contents stirred and a nitrogen flow established. The reagents were heated to reflux (85° C.) After 30 minutes of reflux initiator was added. After a further 30 minutes of reflux, the addition (separately) of the composition labelled "Addition 1" (comprising vinyl acetate, initiator, methanol and isopropyl alcohol) and more NaMPSA was commenced. The addition process took 210 minutes. 30 minutes after the additions of the NaMPSA and the composition labelled "Addition 1", more initiator was added, and reflux continued for a further 120 minutes, as shown in Table 1.1.

TABLE 1.1 general method used to make polymers for use as secondary suspending agents

| | QUANTITY | METHOD |
|---|---|---|
| INITIAL PHASE | | |
| NaMPSA (40% in water) | 0.604 g | Weigh into the reactor |
| MeOH | 41.67 g | Set-up reactor, set stirring to 95 rpm and set nitrogen flow |
| IPA | 91.67 g | Heat till reflux appears (85° C.) |
| VAc | 120.02 g | |
| INITIATOR | | |
| TBPEH | 0.2748 g | Add 30 minutes after start of reflux |
| ADDITION 1 | | |
| VAc | 279.98 g | Start dosing Additions 1 and 2 30 minutes after initiator shot |
| TBPEH | 2.20 g | Dose over 210 minutes |
| MeOH | 16.52 g | |
| IPA | 36.34 g | |
| ADDITION 2 | | |
| NaMPSA (40% in water) | 1.396 g | |
| POST-ADDITION | | |
| TBPEH | 0.048 g | Add 30 minutes after Additions 1 and 2 have been added Cook for 2 hours at reflux temperature Distil off methanol |

The method above was performed with varying amounts of NaMPSA, adjusting the isopropanol level to keep the molecular weight approximately constant, and the conversion rates monitored, the results being shown in Table 1.2.

TABLE 1.2 properties of polymers as a function of sulfonate content

| Example No. | Theoretical NaMPSA:VAc [% (w/w)] | Conversion [%] | K-value |
|---|---|---|---|
| 1.1 | 0.2 | 100 | 19.7 |
| 1.2 | 0.5 | 100 | 22.0 |
| 1.3 | 1.0 | 99.8 | 22.2 |
| 1.4 | 2.0 | 97.5 | 24.8 |
| 1.5 | 4.1 | 86.2 | 21.0 |

K-value was determined by a single point viscosity measurement, using a calibrated U-viscometer, by the method described above but using a 2% (w/v) solution of the polymer in ethyl acetate.

The solution viscosity=(recorded flow time of the 2% (w/v)solution)/(recorded flow time of ethyl acetate).

The effect on scale-up on the properties of polymers was investigated, the results being shown in Table 1.3. The methods used to obtain the polymers shown in Table 1.1 were essentially reproduced using a 4 liter reactor and using four times the amount of reagents.

TABLE 1.3 properties of polymers as a function of sulfonate content in a 4 liter reactor

| Example No. | Description | Theoretical NaMPSA:VAc [% (w/w)] | Conversion [%] | K-value |
|---|---|---|---|---|
| 1.6 | Scale up of Example 1.1 | 0.2 | 100 | 18.5 |
| 1.7 | Scale up of Example 1.2 but using 2.15 times IPA | 0.5 | 100 | 23.6 |
| 1.8 | Scale up of Example 1.3 | 1.0 | 99.3 | 24.8 |
| 1.9 | Scale up of Example 1.4 | 2.0 | 93.3 | 27.0 |
| 1.10 | Scale up of Example 1.5 | 4.1 | 88.2 | 25.8 |

Conversion levels were comparable for the polymers prepared on 1 liter and 4 liter scales. Scale up appeared to give rise to an increased K-value.

The actual amount of NaMPSA incorporated into the polymer was measured by measuring the residual NaMPSA content by HPLC using the following method:
Column: Ascentis Express® C8 15 cm*4.6 mm, 2.7 μm (supplied by Sigma Supelco)
Mobile phase: acrylonitrile:demineralised water 50:50+1 ml/liter acetic acid
Wavelength: 190 nm
Flow rate: 0.8 ml/minute
Column temp: 40° C.
Run time: 10 minutes A 1000 ppm NaMPSA standard was prepared by weighing 0.1 g of NaMPSA into a 100 ml volumetric flask and making to the mark with a 50:50 solution of acrylonitrile:demineralised water. From this stock solution standards of 100, 50, 10 and 5 ppm NaMPSA were prepared with appropriate dilutions. These standards transferred to HPLC vials were run by the above conditions.

Samples were prepared by weighing 0.1 g of sample into a 10 ml volumetric flask and making to the mark with a 50:50 solution of acrylonitrile: demineralised water. Once the samples had dissolved, they were treated with Carrez® Clarification Reagent Kit (BioVision Inc.) and the resulting precipitate was centrifuged. The supernatant was decanted into an HPLC vial and run by the above conditions.

A percentage incorporation of NaMPSA into the polymer could then be determined from the actual and theoretical values of NaMPSA, as shown in Table 1.4. In Table 1.4 below, C. Ex. 1 is comparative example 1.

TABLE 1.4 measured NaMPSA content of polymer versus theoretical NaMPSA content

| Polymer Example No. | Theoretical NaMPSA content [% (w/w$_{VAc}$)] | Residual NaMPSA [%] | Actual NaMPSA content [% (w/w$_{VAc}$)] | Incorporation of NaMPSA [%] |
|---|---|---|---|---|
| C. Ex. 1 | 0 | 0 | 0 | 100 |
| 1.1 | 0.2 | 0.002 | 0.198 | 99.0 |
| 1.7 | 0.5 | below detection limit | >0.498 | >99.6 |
| 1.11 | 1.3 | below detection | >1.298 | >99.8 |

TABLE 1.4-continued measured NaMPSA content of polymer versus
theoretical NaMPSA content

| Polymer Example No. | Theoretical NaMPSA content [% (w/w$_{VAc}$)] | Residual NaMPSA [%] | Actual NaMPSA content [% (w/w$_{VAc}$)] | Incorporation of NaMPSA [%] |
|---|---|---|---|---|
| | | limit | | |
| 1.12 | 1.6 | 0.01 | 1.59 | 99.4 |
| 1.4 | 2.0 | 0.43 | 1.57 | 78.5 |
| 1.13 | 3.0 | 0.03 | 2.97 | 99.0 |
| 1.5 | 4.1 | 1.31 | 2.83 | 68.4 |

GPC was used to determine the molecular weights of the polymers mentioned above (number average molecular weight, $M_n$; weight average molecular weight, $M_w$), as shown in Table 1.5.

TABLE 1.5 molecular weights of the copolymers to be used
as secondary suspending agents

| Example No. | NaMPSA:VAc [% w/w] | Reactor size [liter] | GPC Results $M_n$ [g/mol] | $M_w$ [g/mol] | PDI |
|---|---|---|---|---|---|
| C. Ex. 1 | 0 | 1 | 11,400 | 35,600 | 3.12 |
| Ex. 1.1 | 0.2 | 1 | 6,500 | 21,700 | 3.34 |
| Ex. 1.7 | 0.5 | 1 | 8,200 | 27,700 | 3.39 |
| Ex. 1.3 | 1.0 | 1 | 2,500 | 21,200 | 8.57 |
| Ex. 1.11 | 1.3 | 1 | 6,400 | 21,900 | 3.41 |
| Ex. 1.12 | 1.6 | 1 | 5,500 | 19,200 | 3.47 |
| Ex. 1.4 | 2.0 | 1 | 1,400 | 15,300 | 10.92 |
| Ex. 1.13 | 3.0 | 1 | 4,900 | 17,000 | 3.47 |
| Ex. 1.5 | 4.1 | 1 | 1,100 | 10,400 | 9.55 |
| Ex. 1.8 | 1.0 | 4 | 3,800 | 22,000 | 5.78 |
| Ex. 1.9 | 2.0 | 4 | 2,900 | 16,000 | 5.55 |
| Ex. 1.10 | 4.1 | 4 | 2,100 | 11,700 | 5.56 |
| C. Ex. 2 | n/a | — | 5,700 | 15,100 | 2.65 |

Where C. Ex. 2 is Alcotex® A522P, a standard low hydrolysis secondary suspending agent, supplied by Synthomer (UK) Ltd.

$M_w$ and $M_n$ were measured by size exclusion chromatography (SEC) (also known as gel permeation chromatography, GPC) in THF solution. The sample was injected into a PL-GPC-50® system via autosampler, using stabilised THF as a mobile phase and three PL gel columns® in series, each column having dimensions of 300 mm×7.5 mm×10 μm. The system was calibrated with polystyrene standards in the Mp molecular weight range of 6,035,000-580 g/mol, supplied by Agilent Technologies.

It is noted that the higher the sulfonation level, the lower the $M_w$ and $M_n$. Furthermore, the polydispersity index (PDI) ($M_w/M_n$) was relatively high. Testing of the polymers indicated that oligomer levels were with the prescribed limits for the products to be known as polymers.

A secondary emulsion of the polymer of Example 1.8 was generated. Using a Dispermill Yellow-Line 2075® high shear disperser (Atpen Engineering NL.), a 2% (w/w) aqueous solution of Alcotex® 88-47 (an 88 mol % hydrolysed polyvinyl alcohol obtainable from Synthomer (UK) Ltd) was added dropwise into a solution of the polymer of Example 1.8 dissolved in ethyl acetate (50% (w/w) in ethyl acetate) with stirring between 6500 and 7500 rpm until phase inversion was observed. The samples thus obtained were then stripped under vacuum to remove the remaining ethyl acetate.

1.B Production of PVC Using Unhydrolysed Copolymers Obtained by Solution Polymerisation The polymers made in accordance with the methods described above were used as secondary suspending agents in the production of PVC.

Polymerisations were carried out on a 1 liter stainless steel reactor under the following conditions:

TABLE 1.6 general conditions for PVC production on a
1 liter scale

| | |
|---|---|
| Demineralised water | 350 g |
| Vinyl chloride monomer | 189 g |
| Di(4-tert-butylcyclohexyl) peroxydicarbonate | 1,000 ppm (w/w) solids on vinyl chloride |
| Primary suspending agent Alcotex® B72 (supplied by Synthomer (UK) Ltd.), poly(vinyl alcohol) having a degree of hydrolysis of 72.0-74.0 mole % and a block distribution of acetate groups, 4% (w/w) aqueous solution | 950 ppm (w/w) solids on vinyl chloride |
| Secondary suspending agent Alcotex® 552P (supplied by Synthomer (UK) Ltd.), partially hydrolysed poly(vinyl acetate) having a degree of hydrolysis of about 55 mole % and a random distribution of acetate groups, 40% (w/w) aqueous solution or specified example of this invention, 50-80% (w/w) methanolic solution | 450 ppm (w/w) solids on vinyl chloride |
| Sodium bicarbonate (1% (w/w) solution in demineralised water) | 500-700 ppm (w/w) solids on vinyl chloride |

Demineralised water, suspending agents, buffer and initiator were all charged to a 1 liter Büchi® stainless steel reactor (which had been previously coated with Alcotex® 225 Build-up suppressant supplied by Synthomer (UK) Ltd.) and assembled onto the rig. The recipes were designed to give a final grain size that was consistent with a typical commercial product. The reactor was then pressure tested, degassed to atmospheric and then vinyl chloride monomer charged via a volumetric bomb under nitrogen pressure. A suspension of vinyl chloride was prepared under stirring with about 750 rpm. The reactor was then heated within 6 minutes under agitation at 750 rpm to the desired polymerisation temperature of 57° C., stirring with about 750 rpm was continued, the maximum pressure was recorded and the reaction stopped after a pressure drop of 0.2 MPa (by cooling and degassing to atmospheric pressure). The reactor was then subjected to a vacuum of approximately 50 kPa for 45 minutes. The reactor contents were then decanted in to a filter funnel and washed twice with 1% (w/w) sodium lauryl sulfate solution (as an anti-static treatment). The sample was then placed in a circulating fan oven at 50° C. for 12 hours to dry.

The resulting PVC samples were analysed for grain size ($D_{50}$), grain size distribution (GSD), cold plasticiser absorption (CPA), bulk density (BD) and packing factor (PF). Measurement of these parameters is discussed below:

$D_{50}$—this is a measure of grain size (typically given in microns) and is determined thus. 12.5 g of resin is weighed and placed on a stack of sieves having openings of 315, 250, 200, 160, 100 and 75 microns respectively, and a collecting pan for collecting anything that passes through the 75 micron sieve. The stack is secured to a vibrator and shaken for 15 minutes. The mass of resin in each sieve is recorded and each value divided by 12.5 to give a measure of the fraction of the total mass caught by that sieve. The values are plotted on a logarithmic graph and the value at which 50% of the mass is reached is determined.

GSD—grain size distribution. GSD is determined by using the graph obtained for the $D_{50}$ grain size measurement to determine the grain size at which 16% of the mass of the resin is reached, and the grain size at which 84% of the mass of the resin is reached. The GSD is then calculated by halving the difference between the grain size at which 84% of the mass is reached and the grain size at which 16% of the mass is reached and dividing that result by $D_{50}$.

BD—bulk density—a quantity of resin is placed in a fluid bed dryer and dried at 50° C. for an hour. The resin is cooled for an hour. The resin is then poured through a funnel into a stainless steel container of precisely 100 cm³, conforming to ASTM 1895B. A sharp blade is used to level the resin mound, and the container weighed. The BD (bulk density) may be calculated from the mass and volume of the resin in the container.

CPA—the CPA (cold plasticiser absorption) may be determined by carefully weighing 2.5 g of the resin and 4 g and dioctyl phthalate (a plasticiser) into a vessel containing a membrane. The vessel is jacketed and centrifuged at 3000 rpm for an hour (to give same value as the ASTM standard). The vessel is reweighed to determine the mass of plasticiser that has been adsorbed by the resin. A percentage figure relative to the mass of the resin can be calculated.

PF—the packing fraction is a measure of how well the grains of resin pack together. It is calculated thus:

$$PF = \frac{(1 + 0.014 CPA(0.1BD)}{1.4}$$

The properties of the PVC polymers produced using unhydrolysed polyvinyl acetates are shown in Table 1.7, together with a number of runs based upon Alcotex® 552P, also known as C. Ex. 2, a commercial conventional partially hydrolysed polyvinyl acetate secondary suspending agent obtainable from Synthomer (UK) Ltd. The unhydrolysed products were added to the PVC reactor in the form of a methanolic solution. The polymer indicated in Table 1.7 was used as a secondary suspending agent in the production of the PVC.

TABLE 1.7 characteristics of PVC as a function of the secondary suspending agent produced in a 1 liter reactor

| Example no. | Theoretical NaMPSA level [% (w/w $_{VAc}$)] | $D_{50}$ [μm] | GSD | CPA [%] | BD [g/L] | PF |
|---|---|---|---|---|---|---|
| C. Ex. 2 | n/a | 144 | 0.32 | 33.6 | 464 | 48.7 |
| C. Ex. 2 | n/a | 129 | 0.30 | 30.4 | 485 | 49.5 |
| C. Ex. 2 | n/a | 130 | 0.28 | 29.9 | 464 | 47.7 |
| C. Ex. 1 | 0 | 168 | 0.33 | 27.1 | 493 | 48.6 |
| 1.1 | 0.2 | 134 | 0.24 | 34.3 | 469 | 49.6 |
| 1.7 | 0.5 | 126 | 0.25 | 28.7 | 473 | 47.4 |
| 1.3 | 1.0 | 167 | 0.31 | 34.1 | 448 | 47.3 |
| 1.3 | 1.0 | 164 | 0.28 | 33.1 | 477 | 49.9 |
| 1.11 | 1.3 | >500 | N/D | N/D | N/D | N/D |
| 1.12 | 1.6 | >500 | N/D | N/D | N/D | N/D |
| 1.4 | 2.0 | 156 | 0.30 | 33.7 | 460 | 48.4 |
| 1.4 | 2.0 | >300 | N/D | N/D | N/D | N/D |
| 1.13 | 3.0 | >300 | N/D | N/D | N/D | N/D |
| 1.5 | 4.1 | 291 | N/D | N/D | N/D | N/D |
| 1.5 | 4.1 | >300 | N/D | N/D | N/D | N/D |

N/D-indicates that the property was not measured as the grain size $D_{50}$ was greater than 250 microns.

The unmodified polyvinyl acetate, (C. Ex. 1) was used as the control for this set of experiments; the addition of the sulfonated comonomer has increased the porosity and decreased the grain size of the PVC resin. However, a trend of increasing grain size with increasing the quantity of sulfonated comonomer is apparent.

Where satisfactory grain size values were obtained, comparison of the unhydrolysed sulfonated examples with the results for C. Ex. 2 indicated comparable CPA values were observed, this was unexpected. The CPA values reflect the accessible porosity inside the PVC grains, and hence the ease with which the resin could be plasticised in use or the VCM stripped from the resin at the end of the polymerisation. Scale-up experiments in a 10 liter reactor were performed using some of the polymers which were identified in the 1 liter experiments as being of potential use as secondary suspending agents. The following conditions were used at this scale.

TABLE 1.8 general method for PVC production on 10 liter scale

| | |
|---|---|
| Demineralised water | 3,800 g |
| Vinyl chloride monomer | 2,500 g |
| Di(4-tert-butylcyclohexyl) peroxydicarbonate, 40% (w/w) aqueous dispersion diluted to 4% (w/w) | 1,000 ppm (w/w) solids on vinyl chloride |
| Primary suspending agent Alcotex® B72 (supplied by Synthomer (UK) Ltd.), poly(vinyl alcohol) having a degree of hydrolysis of 72.0-74.0 mole % and a block distribution of acetate groups, 4% (w/w) aqueous solution | 1,000 ppm (w/w) solids on vinyl chloride |
| Secondary suspending agent Alcotex 552P (supplied by Synthomer (UK) Ltd.), partially hydrolysed poly(vinyl acetate) having a degree of hydrolysis of about 55 mole % and a random distribution of acetate groups, 40% (w/w) aqueous solution or specified example of this invention, 4% (w/w) methanolic solution | 500 ppm (w/w) solids on vinyl chloride |
| Sodium bicarbonate (1% (w/w) solution in demineralised water) | 200 ppm (w/w) solids on vinyl chloride |
| 2+3-tert-butyl-4-hydroxyanisole (0.2% (w/w) in methanol) | 20 ppm (w/w) solids on vinyl chloride |

Following a pressure test, demineralised water, suspending agents and buffer were all charged to a 10 liter stainless steel reactor (which had been previously coated with Alcotex® 225 Build-up suppressant supplied by Synthomer (UK) Ltd.). The recipes were designed to give a final grain size that was consistent with a typical commercial product. The vinyl chloride monomer was then charged via a mass flow meter under nitrogen pressure. A suspension of vinyl chloride was prepared under stirring at 600 rpm. The reactor was then heated to 57° C. with continued agitation at 600 rpm. Once batch contents reached 57° C., initiator was charged to the vessel under nitrogen pressure. The reactor pressure at initiator addition was recorded and the reaction stopped after a pressure drop of 0.2 MPa (by addition of short stop, cooling and degassing to atmospheric pressure). The reactor was then subjected to a vacuum of approximately 80 kPa for 45 minutes. The reactor contents were then decanted in to a filter funnel and washed twice with 1% (w/w) sodium lauryl sulfate solution (as an anti-static treatment).

The results of those experiments are shown in Table 1.9.

TABLE 1.9 characteristics of PVC as a function of the secondary suspending agent produced in a 10 liter reactor

| Examples polymer no. | Theoretical NaMPSA level [% (w/w$_{VAc}$)] | $D_{50}$ [μm] | GSD | CPA [%] | BD [g/L] | PF |
|---|---|---|---|---|---|---|
| C. Ex. 2 | n/a | 150 | 0.30 | 30.8 | 470 | 48.0 |
| 1.1 | 0.2 | 135 | 0.25 | 27.4 | 536 | 53.0 |
| 1.1 | 0.2 | 146 | 0.26 | 25.2 | 522 | 50.4 |
| 1.7 | 0.5 | 186 | 0.33 | 28.0 | 507 | 50.4 |
| 1.3 | 1.0 | 168 | 0.35 | 28.4 | 477 | 47.7 |

Comparison of the CPA results for the sulfonated polymers against the conventional secondary suspending agent indicated that they were generating similar or slightly lower values, though the bulk density values were comparable or higher.

1.C—Partially Hydrolysed Copolymers of Vinyl Acetate and NaMPSA

A number of the polymers described above were hydrolysed using either an acid or a base catalyst. Hydrolysis of polyvinyl acetate is well known to those skilled in the art. Further guidance in relation to hydrolysis may be found in "Polyvinyl alcohol developments", Edited by C. A. Finch, (C) 1992 John Wiley & Sons Ltd, Chapter 3: Hydrolysis of Polyvinyl Acetate to Polyvinyl Alcohol, by F. L. Marten; C. W. Zvanut, p 57-77. The hydrolysis values obtained are shown as a function of catalyst, starting polymer and hydrolysis time in Table 1.10.

TABLE 1.10 partially hydrolysed polymers for use as secondary suspending agents

| Example Polymer No. | Theoretical NaMPSA [% (w/w$_{VAc}$)] | Catalyst | Hydrolysis level [% mol] | | | | |
|---|---|---|---|---|---|---|---|
| | | | 30 min | 60 min | 90 min | 120 min | 150 min |
| 1.7 | 0.5 | Acid | 27.7 Ex. 1.70 | 32.4 Ex. 1.71 | 38.7 Ex. 1.72 | 44.6 Ex. 1.73 | 48.1 Ex. 1.74 |
| 1.8 | 1.0 | Acid | — | 29.7 Ex. 1.81 | 33.4 Ex. 1.82 | 43.0 Ex. 1.83 | 42.4 Ex. 1.84 |
| 1.8 | 1.0 | Base | 16.2 Ex. 1.85 | 23.8 Ex. 1.86 | 29.7 Ex. 1.87 | 33.8 Ex. 1.88 | 35.0 Ex. 1.89 |
| 1.9 | 2.0 | Base | 24.1 Ex. 1.91 | 31.4 Ex. 1.92 | 34.4 Ex. 1.93 | 34.6 Ex. 1.94 | 36.6 Ex. 1.95 |
| 1.10 | 4.1 | Base | 26.2 Ex. 1.101 | 31.3 Ex. 1.102 | 25.2 Ex. 1.103 | 25.6 Ex. 1.104 | 27.4 Ex. 1.105 |
| 1.7 | 0.5 | Base | 14.5 Ex. 1.75 | 17.0 Ex. 1.76 | 26.5 Ex. 1.77 | 20.0 Ex. 1.78 | 22.0 Ex. 1.79 |

1.D Production of PVC Using Hydrolysed Copolymer Obtained by Solution Polymerisation A number of examples identified in Table 1.10 were tested as prospective secondary suspending agents in the 1 liter scale polymerisation of vinyl chloride, and the characteristics of the PVC so made are shown in Table 1.11. The general method described above for the production of PVC in a 1 liter reactor was used. The hydrolysed example polymers were added as methanolic solutions.

TABLE 1.11 characteristics of PVC made using partially hydrolysed polymers

| Example Polymer No. | Description | $D_{50}$ [μm] | GSD | CPA [%] | BD [g/L] | PF |
|---|---|---|---|---|---|---|
| C. Ex. 2 | Standard | 147 | 0.47 | 28.6 | 500 | 50.03 |
| C. Ex. 2 | Standard | 136 | 0.36 | 30.0 | 482 | 48.91 |
| 1.73 | 0.5% (w/w) NaMPSA, 45 mol % acid hydrolysed | 169 | 0.37 | 31.1 | 462 | 47.43 |
| 1.78 | 0.5% (w/w) NaMPSA, 20 mol % base hydrolysed | 132 | 0.24 | 30.1 | 483 | 49.03 |
| 1.86 | 1.0% (w/w) NaMPSA, 24 mol % base hydrolysed | 167 | 0.34 | 31.5 | 482 | 49.59 |
| 1.88 | 1.0% (w/w) NaMPSA, 34 mol % base hydrolysed | 171 | 0.34 | 33.3 | 493 | 51.64 |
| 1.92 | 2.0% (w/w) NaMPSA, 31 mol % base hydrolysed | >300 | N/D | N/D | N/D | N/D |
| 1.94 | 2.0% (w/w) NaMPSA, 35 mol % base hydrolysed | 292 | N/D | N/D | N/D | N/D |

N/D-indicates that the property was not measured as the grain size $D_{50}$ was greater than 250 microns.

The CPA values from the sulfonated polymers were comparable to those of the C. Ex. 2 control, and tended to decrease as the degree of hydrolysis decreased.

The grain size values from the sulfonated polymers showed a dependence upon the degree of hydrolysis of the sample, generally increasing as the degree of hydrolysis increased, and as the degree of sulfonation increased.

The packing fraction and the bulk density of the PVC produced using the partially hydrolysed polymers are at least comparable with those of the PVC produced using the standard, C. Ex. 2 polymer.

Part 2—Polymers Made by Emulsion Polymerisation
2.A—Co-polymers of Vinyl Acetate and 2-methyl-2-propene-1-sulfonic Acid Sodium Salt Made by Emulsion Polymerisation.

TABLE 2.A materials

| Product | Name | Mw [g/mol] | Purity [%] | CAS n° |
|---|---|---|---|---|
| AHPS | 3-Allyloxy-2-hydroxy-1-propanesulfonic acid | 218.20 | 40 | 52556-42-0 |
| AMPS | 2-acrylamido-2-methylpropane sulfonic acid sodium salt | 229.23 | 50 | 5165-97-9 |
| A88-47 | Alcotex 88-47 | ≈90 000 | ≥99 | 900-89-5 |
| $H_2O_2$ | Hydrogen peroxide | 34.0 | 35 | 7722-84-1 |
| IPA | Isopropanol | 60.10 | ≥99 | 67-63-0 |
| MeOH | Methanol | 32.1 | ≥99 | 67-56-1 |
| NaMPSA | 2-Methyl-2-propene-1-sulfonic acid sodium | 158.1 | ≥98 | 1561-92-8 |
| NaPS | Sodium persulfate | 238.1 | ≥98 | 7775-27-1 |
| NDM | N-dodecyl mercaptan | 202.4 | ≥98 | 112-55-0 |
| SB | Sodium Bicarbonate | 84.0 | ≥99 | 144-55-8 |
| SC | Sodium citrate | 214.1 | ≥99 | 18996-35-5 |
| SDBS | Sodium Dodecyl Benzene Sulfonate | 348.5 | ≥99 | 25155-30-0 |
| SDHS | Sodium dihexyl sulfosuccinate | 388.45 | ~80 | 2373-38-8 |
| SDS | Sodium dodecyl sulfate | 288.4 | ≥98 | 151-21-3 |
| SVS | Sodium vinyl sulfonate | 130.10 | 25 | 3039-83-6 |
| tBHP | tert-Butyl hydroperoxide | 90.12 | 35 | 75-91-2 |

TABLE 2.A-continued

| | materials | | | |
|---|---|---|---|---|
| Product | Name | Mw [g/mol] | Purity [%] | CAS n° |
| VAc | Vinyl Acetate | 86.1 | ≥99 | 108-05-4 |
| VCM | Vinyl Chloride | 62.5 | ≥99 | 75-01-4 |

Synthesis of emulsion co-polymers of vinyl acetate ("VAc") and a sulfonate, 2-methyl-2-propene-1-sulfonic acid sodium salt ("NaMPSA") will now be described.

250 g of water ($H_2O$) and the required quantity of NaMPSA were charged to a 1 liter reactor and heated to 70° C. under agitation. Upon reaching 70° C., 10 g of an aqueous solution of NaPS (13.8% wt) was introduced. After 5 minutes, delayed additions of monomer (150 g of VAc mixed with 50 g of IPA) and 40 g of an aqueous solution of NaPS (13.8% wt) were fed separately over 1 hour. Once these additions had been completed, a solution of 2 g of NaMPSA solubilised in 50 g of $H_2O$ was added to the reactor, and the reaction heated and agitated for a further 2 hours at 70° C., followed immediately by a further 2 hours at 85° C. (known as the 'cooking step').

A number of levels of NaMPSA were evaluated and the runs are listed in Table 2.1.

TABLE 2.1

| Example No. | NaMPSA:VAc [% (w/w)] | K-v[i)] | Final TSC [%] |
|---|---|---|---|
| C. Ex. 3 | 0.3 | | unstable |
| C. Ex. 4 | 1.0 | | unstable |
| Ex. 2.1 | 1.3 | 30.3 | 23.2 |
| Ex. 2.2 | 1.7 | 36.0 | 24.1 |
| Ex. 2.3[1] | 1.7 | 32.7 | 30.0 |
| Ex. 2.4 | 2.3 | 35.0 | 25.1 |
| Ex. 2.5[2] | 2.3 | 31.8 | 28.9 |
| Ex. 2.6 | 3.0 | 35.0 | 23.4 |
| Ex. 2.7 | 3.7 | 35.0 | 22.9 |
| Ex. 2.8 | 1.7 | 32.8 | 37.0 |

[i)]Measured in MeOH
[1]1 g NaPS in 25 g of water used for cooking step
[2]Scale-up of Example 4 in 4 liter reactor The TSC Test Method The percentage total solids content (TSC) is determined by weighing a sample of material before and after drying under an IR lamp for 2 hours.

$$TSC(\%) = \left(\frac{W3 - W1}{W2 - W1}\right) \times 100$$

Where W1=Weight of sample container
W2=Weight of container plus sample before drying
W3=Weight of container plus sample after drying
K-v was measured as described above, using methanol as a solvent.

Example 2.8 above was slightly different from the other above-mentioned examples in that a "seed" comprising VAc was created in the reactor at the start of the reaction. 200 g of water, NaMPSA (0.5 g) and VAc (5 g) were charged to a 1 liter reactor and heated to 70° C. under agitation. Upon reaching 70° C., 4 g of an aqueous solution of NaPS in water (50 g) was introduced. After 5 minutes, the delayed additions of monomer (200 g of VAc mixed with 50 g of IPA) and NaPS (3 g) in water (50 g) were fed separately over 1 hour. Once these additions had been completed, hydrogen peroxide solution 1 mL (35% wt) was added to the reactor, and the reaction heated and agitated for a further 2 hours at 70° C., followed immediately by a further 2 hours at 85° C. (known as the 'cooking step').

The pH of examples 2.1 to 2.8 was found to be rather low which may cause hydrolysis of acetate groups to hydroxyl groups at elevated temperatures. Further polymers in accordance with the present invention were synthesised in the presence of a buffer to generate emulsions having a higher pH (Table 2.2).

The general method used will now be described. 250 g of water and 3.5 g of NaMPSA were mixed in a 1 liter reactor and heated to 70° C. under agitation. Upon reaching 70° C., 10 g of an aqueous solution of NaPS (7.4% wt) was introduced. After 5 minutes, delayed additions of monomer (200 g of VAc mixed with 50 g of IPA), and 40 g of an aqueous solution of NaPS (7.4% wt) were fed separately into the reactor over 1 hour. At the same time, a buffer solution was also added (but over different times scales). At complete addition of the monomer and NaPS, 1 mL of hydrogen peroxide ($H_2O$) was added and the reaction was further cooked 2 hours at 70° C. and 2 hours at 85° C.

TABLE 2.2

| Example No. | NaMPSA: VAc [% (w/w)] | NaPS: VAc [% (w/w)] | Buffer: NaPS [% (w/w)] | Buffer addition | K-v[i)] | Final pH |
|---|---|---|---|---|---|---|
| 2.9A | 2.30 | 5.3 | N/A | N/A | N/A | 1.7 |
| 2.9 | 1.75 | 2.0 | SB 100 SC 100 | Feed at t = 30 min over 30 min | 31.3 | 5.0 |
| 2.10 | 1.75 | 2.0 | SB 100 SC 100 | Feed at t = 0 over 1 h | 35.1 | 5.0 |
| 2.11 | 1.75 | 2.0 | SB 100 SC 100 | Feed at t = 0 over 2 h | NA | 5.3 |
| 2.12[1] | 1.75 | 2.0 | SB 100 SC 100 | Feed at t = 0 over 2 h | NA | 5.2 |
| 2.13 | 2.33 | 5.3 | SB 100 SC 100 | Feed at t = 0 over 2 h | 26.3 | 5.3 |
| 2.14[2] | 1.75 | 2.4 | SB 67 SC 67 | Feed at t = 0 over 2 h | 26.8 | 6.1 |

[i)]Measured in MeOH
[1]No $H_2O_2$ added
[2]Feed of NaMPSA: 250 g $H_2O$, 1 g NaMPSA initial. 250 g VAc, 75 g IPA, 6 g NaPS in 50 g of $H_2O$, and 2.5 g of NaMPSA, 4 g of SB and 4 g of SB in 50 g of $H_2O$ were fed separately over 1 hour as was the NaPS solution. Once the feeds had been completed 1 mL of $H_2O_2$ was added and the reaction was allowed to react for a further 2 hours at 70° C. and 2 hours at 85° C.

In Table 2.2, Feed at t=30 min over 30 min is defined as the addition of the buffer solution started 30 minutes after the initial monomer & initiator charge, and the buffer solution was added to the reactor over 30 minutes. Similarly, Feed at t=0 minutes over 1 hour is defined as the addition of the buffer solution started at the same time as the initial monomer & initiator charge, and the buffer solution was added to the reactor over 1 hour.

It can be seen that the final emulsion pH was greater than 5 in those examples where a buffer was used.

A further example of a polymer emulsion for use in accordance with the present invention was synthesised using NDM as a chain transfer agent.

TABLE 2.3

| Example No. | NaMPSA:VAc [% (w/w)] | NaPS:VAc [% (w/w)] | CTA | CTA:VAc [% (w/w)] | K-v | pH |
|---|---|---|---|---|---|---|
| 2.14A | 1.7 | 2.0 | NDN | 0.9 | 72 | 5.0 |

Example 2.14A was based on Example 2.14, but using NDM as a chain transfer agent. It was found that decreasing the amount of IPA resulted in a destabilisation of the resultant emulsion. It was found that replacing IPA with NDM provided stable emulsions, but the resultant polymers (aside from that of Example 2.14A) were insoluble in methanol.

The emulsions of the examples above were self-stabilised i.e. there were no surfactants or colloids added to stabilise the emulsions. Further emulsions were synthesised using various surfactants and colloids. Reactions were performed at 70° C., with 250 g $H_2O$, 3.5 g NaMPSA, 1.5 g of surfactant, 150 g VAc, 50 g IPA, 8 g NaPS in 50 g of $H_2O$. VAc and IPA solution was fed over 1 hour, as was the NaPS solution. Then, at the end of the additions, the reaction was allowed to react out for 2 hours at 70° C. and 2 hours at 85° C.

TABLE 2.4

| Example No. | NaMPSA:VAc [% (w/w)] | Surfactant | Surfactant:VAc [% (w/w)] | K-v[i) |
|---|---|---|---|---|
| 2.15[1] | 2.3 | SDBS | 1.0 | 32.7 |
| 2.16[2] | 2.3 | SDBS | 1.0 | 32.8 |

[1]based on Example 2.4
[2]based on Example 2.12

The emulsions formed using SDBS were found to be stable, whereas polymers prepared in the presence of SDS coagulated.

Polymer emulsions for use in accordance with the present invention were synthesised using a polyvinyl alcohol colloid, in this case Alcotex® 88-47 (supplied by Synthomer (UK) Ltd.), poly(vinyl alcohol) having a degree of hydrolysis of 86.7-88.7 mole % and a viscosity of 45-49 mPa·s, (4% (w/w) aqueous solution, 20° C.). The colloid was introduced in to the emulsion formulation in different ways: initial, delayed and post-added, and the results are shown in Table 2.5.

For Example 2.17, 250 g of water, 5 g of VAc, 2 g of Alcotex® 88-47 and 0.5 g of NaMPSA were mixed in a 1 liter reactor and heated at 70° C. Once 70° C. was reached, 10 g of an aqueous solution of NaPS (7.4% wt) was introduced. After 5 minutes, delayed additions of monomer (200 g of VAc mixed with 50 g of IPA), 40 g of an aqueous solution of NaPS at 7.4% wt and a solution composed of 4 g of sodium bicarbonate, 4 g of sodium citrate and 3 g of NaMPSA in 50 g of $H_2O$ were fed separately over 1 hour. Once the additions were completed, 1 mL of $H_2O_2$ was added and the reaction was further cooked for 2 hours at 70° C. and 2 hours at 85° C. The process for the other examples was as set-out in Table 2.5.

TABLE 2.5

| Example No. | | 2.17 | C. Ex. 100[d)] | C. Ex. 101[c)] | C. Ex. 102[d)] | C. Ex. 103[c)] | C. Ex. 104[c)] | 2.18 | 2.19 | C. Ex. 105[c)] | C. Ex. 106[d)] |
|---|---|---|---|---|---|---|---|---|---|---|---|
| INITIAL | $H_2O$ [g] | 250 | 200 | 200 | 200 | 200 | 200 | 200 | 200 | 200 | 200 |
| | NaMPSA [g] | 0.5 | 3.5 | 1 | 3.5 | 1 | 3.5 | 3.5 | 3.5 | 3.5 | 1.0 |
| | VAc [g] | 5 | — | — | — | — | — | — | — | — | — |
| | A88 [g] | 2 | — | — | — | — | — | — | — | — | — |
| FEED | VAc/IPA [g/g] | 200/50 | 250/75 | 250/75 | 250/75 | 250/75 | 300/75 | 150/50 | 200/50 | 250/50 | 250/50 |
| | NaPS/$H_2O$ [g] | 4/50 | 6/50 | 6/50 | 6/50 | 6/50 | 6/50 | 8/50 | 8/50 | 4/50 | 4/50 |
| | SC/SB/$H_2O$ [g/g/g] | 4/4/50 | 5/5/50 | 5/5/50 | 5/5/50 | 5/5/50 | 4/4/50 | — | — | 4/4/50 | 4/4/50 |
| | NaMPSA [g] | 3 | — | 2.5 | — | 2.5 | — | — | — | — | 2.5 |
| | A88/$H_2O$ [g/g] | — | 2/50 | 2/50 | — | — | — | — | — | — | — |
| POST | A88/$H_2O$ [g/g] | — | — | — | 2/50 | 2/50 | 4/50 | 3/50 | 2/50 | 4/50 | 4/50 |

[c)]Coagulated
[d)]Destablished on storage at room temperature

The emulsion of Example 2.17 showed a TSC of 35%, conversion of 95%, K-value of 37, pH of 5.0. The Examples and comparative examples of Table 2.5 suggest that, for this particular polymer, it is desirable to have some colloid in the initial reaction mixture, especially if the reaction is buffered.

An emulsion was formed using an alternative polyvinyl alcohol colloid, without using IPA. Emulsion polymer of Example 2.20 was synthesised as follows: 300 g of distilled water and 10 g of M5-88 (Celvol® 205 Polyvinyl alcohol, supplied by Celanese corporation) were introduced into a 1 liter reactor and temperature was set at 80° C. Once this temperature was reached and the PVOH was fully solubilised, 200 g of VAc was added over ~2 hours (at 1.79 mL/minute). At the same time the following solutions were added over ~2 hours (at 0.4 mL/minute; i) 1 g of NaPS in 50 g of distilled water and ii) 1.2 g of sodium bicarbonate, 1.2 g of sodium citrate, 2.5 g of NaMPSA in 50 g of distilled water. Upon completion of the additions, the reaction was further cooked 1 hour at 80° C. The emulsion characteristics were:

GC: 1.5% VAc
K-value: 74.3
TSC: 35.8%
pH: 4.7
Particle size: 440 nm

The residual vinyl acetate measurements were performed using a Perkin Elmer Turbomatrix® headspace sampling device. 0.5 g of sample was weighed into a headspace vial. 1 mL of water was added, followed by 2 mL of an internal standard (1,4-dioxane supplied by Sigma Aldrich Co. LLC). The headspace vial was tightly capped and placed on a shaker for 30 minutes, before being loaded into the headspace carousel. The vial was heated at 90° C. for 1 hour before the headspace vapour was injected into the GC equipped with Flame Ionisation Detector (FID).

As an example of an alternative colloid, a cellulosic stabiliser was used, the formulation was based upon Example 2.20, in presence of a hydroxypropyl methyl cellulose F50® supplied by The Dow Chemical Company, at 80° C.

TABLE 2.5a

| Example No. | F50 [% (w/w$_{VAc}$)] | Sulfonated monomer [% (w/w$_{VAc}$)] | TSC [%] |
|---|---|---|---|
| 2.20a | 5 | NaMPSA 1.75 | 33.5 |
| 2.20b | 2 | NaMPSA 1.75 | 33.7 |
| 2.20c | 2 | AMPS 1.75 | 33.7 |

Further polymers to be used in accordance with the present invention were made by first synthesising a polyvinyl acetate seed and then adding the remaining vinyl acetate, the NaMPSA and sodium persulfate. The Examples are shown in Table 2.6.

TABLE 2.6

| Example No. | Modification | NaMPSA [% (w/w$_{VAc}$)] | TSC$_{theo}$ [%] | VAc$_{GC}$ [%] | K-v $^{i)}$ | PS [nm] |
|---|---|---|---|---|---|---|
| 2.21 | Reference | 1.75 | 35.8 | 1.53 | 74.3 | 440 |
| 2.22 | Buffer in the batch | 1.75 | 35.8 | 1.37 | 98.0 | 420 |
| 2.23 | Higher TSC | 1.75 | 41.0 | 1.67 | 87.8 | 455 |
| 2.24 | Higher NaMPSA % | 2.00 | 35.8 | NA | 94.5 | NA |
| 2.25 | SVS 0.25% (w/w$_{VAc}$) | 1.66 | 35.9 | 1.68 | 74.3 | 364 |
| 2.26 | SVS 1.75% (w/w$_{VAc}$) | 0 | 35.8 | NA | 81.9 | NA |
| 2.27 | AMPS 1.75% (w/w$_{VAc}$) | 0 | 35.8 | NA | 71.9 | NA |
| 2.28 | AHPS 1.75% (w/w$_{VAc}$) | 0 | 35.8 | NA | 80.0 | NA |
| 2.29 | MA80 1.1% (w/w$_{VAc}$) | 2.30 | 31.8 | 2.10 | 78 | 424 |
| 2.30 | MA80 1.1% (w/w$_{VAc}$) | 0 | 35.8 | 0.15 | 78 | 430 |

SVS: Sodium vinyl sulfonate
AHPS: 3-Allyloxy-2-hydroxy-1-propanesulfonic acid
MA80: Sodium dihexyl sulfosuccinate The examples of Table 2.6 demonstrate that sulfur-containing monomers other than NaMPSA may be used.

Synthesis of the emulsion polymers of Table 2.6 is now described below.

EXAMPLE 2.21

900 g of distilled water was introduced into the 4 liter reactor and temperature was set at 80° C. Once the temperature was reached, 2.2 g of NaPS was introduced under agitation (150 rpm) and 60 g of VAc was fed over ~30 minutes (at 2.14 mL/minute). At the end of the addition, 540 g of VAc was added over ~2 hours at 4.8 mL/minutes at the same time 2 feeds of the following solution were added over ~2 hours at 0.8 mL/minute; i) 0.8 g of NaPS in 100 g of distilled water and ii) 0.75 g of sodium bicarbonate, 0.75 g of sodium citrate, 10.5 g of NaMPSA in 100 g of distilled water. Upon completion of the additions, the reaction was further cooked 1 hour at 80° C.

EXAMPLE 2.22

Repeat of Example 2.21 except 0.75 g of sodium citrate and 0.75 g of sodium bicarbonate charged into the batch.

EXAMPLE 2.25

225 g of distilled water was introduced into the 1 liter reactor and temperature was set at 80° C. Once this temperature was reached, 0.55 g of NaPS was introduced under agitation (150 rpm) and 15 g of VAc was added over ~30 minutes (at 0.5 mL/minute). At the end of the addition, 135 g of VAc was added over ~2 hours (at 1.2 mL/minute) at the same time 2 feeds of the following solution were added over ~2 hours (at 0.2 mL/min): i) 0.2 g of NaPS in 25 g of distilled water and ii) 0.2 g of sodium bicarbonate, 0.2 g of sodium citrate, 2.5 g of NaMPSA and 1.5 g of SVS in 25 g of distilled water. Upon completion of the additions, the reaction was further cooked for 1 hour at 80° C.

EXAMPLE 2.29

225 g of distilled water and 0.2 g of sodium bicarbonate, 0.2 g of sodium citrate were introduced into the 1 liter reactor and temperature was set at 80° C. Once the temperature was reached, 0.55 g of NaPS was introduced under agitation (150 rpm) and 15 g of VAc was added over 30 minutes at 0.5 mL/minute. At the end of the addition, 135 g of VAc was added over ~2 hours at 1.2 mL/minute at the same time 2 feeds of the following solution were added over ~2 hours at 0.2 mL/minute: i) 0.2 g of NaPS in 25 g of distilled water and ii) ii) 3.5 g of NaMPSA and 1.65 g of Aerosol MA-80 (Sodium dihexyl sulfosuccinate) in 25 g of distilled water. Upon completion of the additions, the reaction was further cooked for 1 hour at 80° C.

EXAMPLE 2.23

900 g of distilled water, 1.3 g of sodium bicarbonate and 1.3 g of sodium citrate were introduced into a 4 liter reactor and temperature was set at 80° C. Once this temperature had been reached, 2.2 g of NaPS was introduced under agitation (150 rpm) and 60 g of VAc was fed over ~30 minutes (at 2.14 mL/minute). At the end of the addition, 690 g of VAc was added over ~2 hours 40 minutes (at 4.6 mL/minute); at the same time 2 feeds of the following solution were added over ~2 hours 40 minutes (at 0.63 mL/minute): i) 1.1 g of NaPS in 100 g of distilled water and ii) 13.1 g of NaMPSA in 100 g of distilled water. Upon completion of the additions, the reaction was further cooked for 1 hour at 80° C.

EXAMPLE 2.30

225 g of distilled water and 0.2 g of sodium bicarbonate, 0.2 g of sodium citrate were introduced into the 1 liter reactor and temperature was set at 80° C. Once the temperature was reached, 0.55 g of NaPS was introduced under agitation (150 rpm) and 15 g of VAc was added over ~30 minutes (at 0.5 mL/minute). At the end of the addition, 135 g of VAc was added over ~2 hours (at 1.2 mL/minute); at the same time the following solution of 0.2 g of NaPS, 1.65 g of MA-80 in 25 g of distilled water was added over ~2 hours at 0.2 mL/minute. Upon completion of the additions, the reaction was further cooked for 1 hour at 80° C.

EXAMPLE 2.26

Repeat of Example 2.25 except 0.2 g of sodium bicarbonate, 0.2 g of sodium citrate were charged in the batch and ii) 3 g of SVS (sodium vinyl sulfonate) in 25 g of distilled water.

EXAMPLE 2.28

Repeat of Example 2.22 except solution ii) 6.5 g of 3-Allyloxy-2-hydroxy-1-propanesulfonic acid (AHPS) at 40% wt in 21 g of distilled water.

EXAMPLE 2.27

Repeat of Example 2.28 except solution ii) 5.25 g 2-acrylamino-2-methylpropane sulfonic acid sodium salt (AMPS) at 50% wt in 22.4 g of distilled water.

Further experiments were performed by incorporating the sulfur-containing monomer into the "seed". A polyvinyl alcohol was used to stabilise the emulsions formed.

Further examples of polymers for use in accordance with the present invention were synthesised using a higher level of chain transfer agent, persulfate or adding a second initiator (hydrogen peroxide).

TABLE 2.7

| Example No. | Modification | K-v |
|---|---|---|
| 2.22 | Reference | 98 |
| 2.31 | NDM 0.5% (w/w$_{VAc}$) | 78 |
| 2.32 | NDM 0.6% (w/w$_{VAc}$) | 38 |
| 2.33 | NDM 1.0% (w/w$_{VAc}$) | 37 |
| 2.34 | NaPS 0.7% (w/w$_{VAc}$) | 66 |
| C. Ex. 200 | NaPS 1.0% (w/w$_{VAc}$) | 63 |
| C. Ex. 201 | NaPS 2.0% (w/w$_{VAc}$) | 54 |
| C. Ex. 202 | NaPS 5.0% (w/w$_{VAc}$) | Unstable |
| 2.35 | H$_2$O$_2$ 0.1% (w/w$_{VAc}$) | 48 |
| C. Ex. 203 | H$_2$O$_2$ 0.5% (w/w$_{VAc}$) | Unstable |

Syntheses were based on Example 2.22. It was demonstrated that increasing the amount of chain transfer agent led to a lower K value.

Further examples of polymers for use in accordance with the present invention were synthesised using a cross-linking monomer, TTT (1,3,5-triallyl-1,3,5-triazine-2,4,6-trione), based on the synthesis for Example 2.22. Example 2.36 contained 1% w/w TTT, and Example 2.37 contained 5% w/w TT on vinyl acetate, both gave polymers which were insoluble in methanol and THF.

Examples of polymer for use in accordance with the present invention were synthesised using one or more monomers other than VAc, and the results are shown in Table 2.8 below.

TABLE 2.8

| Example No | Monomer | $M_n$ [g/mol] | $M_w$ [g/mol] | PDI |
|---|---|---|---|---|
| C. Ex. 300 | MMA | | Unstable | |
| 2.38 | MMA + NDM 1.75% (w/w$_{MMA}$) | 15,300 | 59,000 | 3.9 |
| 2.39 | MMA + BA (50/50) | 55,800 | 545,600 | 9.8 |
| 2.40 | BA | 52,300 | 487,000 | 6.3 |

Where, MMA is methyl methacrylate and BA is butyl acrylate. All runs were carried out at 80° C. using 275 g of H$_2$O, 0.2 g of SB, 0.75 g of SC, 0.75 g of NaPS, 150 g of (mixed) acrylate monomer(s), 2.6 g of NaMPSA).

These polymers were found to be insoluble in methanol, therefore molecular weight data ($M_w$ and $M_n$) were measured by size exclusion chromatography (SEC) (also known as gel permeation chromatography, GPC) in THF solution. The sample was injected into a PL-GPC-50® system via an autosampler, using stabilised THF as a mobile phase and three PL gel® columns in series, each column having dimensions of 300 mm×7.5 mm×101 μm. The system was calibrated with polystyrene standards in the Mp molecular weight range of 6,035,000-580 g/mol, supplied by Agilent Technologies.

Where, $M_n$=number average molecular weight, $M_w$=weight average molecular weight, and the polydispersity index (PDI) is defined as $M_w/M_n$.

Further examples of polymers for use in accordance with the present invention were synthesised using different ratios of sulfonate monomer in the seed, at different sulfonate monomer contents and at different solid contents.

TABLE 2.9

| Ex. No. | Sulfur monomer [% (w/w$_{VAc}$)] | Sulfur monomer [ratio initial:delayed] | TSC [%] | k-v | pH |
|---|---|---|---|---|---|
| 2.41 | 0 | n/a | 33.0 | 61.6 | 4.7 |
| 2.42 (1) | NaMPSA; 2 | 1:2 | 17.1 | 49.2 | 7.0 |
| 2.43 | SVS; 2 | 1:2 | 36.2 | 41.6 | 4.7 |
| 2.44 | AMPS; 2 | 1:2 | 36.0 | 32.7 | 4.7 |
| 2.45 | NaMPSA; 2 | 2:1 | 35.5 | 59.7 | 4.7 |
| 2.46 | SVS; 2 | 2:1 | 35.5 | 45.7 | 5.0 |
| 2.47 | AMPS; 2 | 2:1 | 36.1 | 36.9 | 5.0 |
| 2.48 | NaMPSA: 2 | 3:0 | 32.0 | n/a | 5.0 |
| 2.49 | SVS; 2 | 3:0 | 35.4 | 37.3 | 5.0 |
| 2.50 | AMPS: 2 | 3:0 | 35.2 | 36.0 | 5.6 |
| 2.51 | NaMPSA: 2.5 | 1:2 | 32.9 | 73.0 | 5.4 |
| 2.52 | NaMPSA: 3.0 | 1:2 | 33.1 | 79.2 | 5.3 |
| 2.53 | NaMPSA: 5.0 | 1:2 | Unstable | | |
| 2.54 (2) | NaMPSA: 2 | 1:2 | 34.5 | 27.8 | 5.4 |
| 2.55 | NaMPSA: 2 | 1:2 | 48.5 | 34.6 | 5.5 |
| 2.56 (2) | NaMPSA: 2 | 1:2 | 48.7 | 44.5 | 5.5 |
| 2.57 (2) | AMPS: 2 | 0:3 | 51.3 | 21.4 | 5.2 |
| 2.58 (2, 3) | AMPS: 2 | — | 50.8 | 23.1 | 5.3 |
| 2.59 (2, 4) | AMPS: 2 | 0:3 | 49.5 | 29.8 | 4.9 |

(1) pH adjusted with 20% Sodium bicarbonate aqueous solution
(2) with 1% NDM % (w/w$_{VAc}$)
(3) addition of sulfonated monomer as explained below
(4) addition of initiator solution delayed as explained below

EXAMPLE 2.42

225 g of distilled water, 2 g of sodium bicarbonate, 2 g of sodium citrate and 1 g of NaMPSA were introduced into the 1 liter reactor and temperature was set at 80° C. Once the temperature was reached, 1 g of NaPS was introduced under agitation (150 rpm) and 15 g of VAc was added over ~30 minutes (at 0.5 mL/minute). At the end of the addition, 135 g of VAc was added over ~2 hours (at 1.2 mL/minute); at the same time the following solutions were added over ~2 hours at 0.2 mL/minute, i) 0.5 g of NaPS in 25 g of distilled water, ii)2 g of NaMPSA in 25 g of distilled water. Upon completion of the additions, the reaction was further cooked for 2 hours at 85° C.

EXAMPLE 2.57

800 g of distilled water, 10 g of sodium bicarbonate, 10 g of sodium citrate were introduced into the 4 liter reactor and temperature was set at 80° C. Once the temperature was reached, 6.72 g of NaPS was introduced under agitation (150 rpm) and 48 g of VAc with 0.48 g of NDM were added over ~1 h (at 0.86 mL/minute). At the end of the addition, 912 g of VAc with 9.12 g of NDM were added over ~4 hours 11 minutes (at 3.89 mL/minute); at the same time the following solutions were added over 2 hours at 0.4 mL/minute, i) 2.88 g of NaPS in 100 g of distilled water, ii) 38.4 g of AMPS in 62 g of distilled water. Upon completion of the additions, the reaction was further cooked for 1 hour at 80° C.

EXAMPLE 2.58

800 g of distilled water, 10 g of sodium bicarbonate, 10 g of sodium citrate were introduced into the 4 liter reactor and temperature was set at 80° C. Once the temperature was reached, 6.72 g of NaPS was introduced under agitation (150 rpm) and an aqueous solution of 38.4 g of AMPS in 62 g of distilled water was added over ~5 hours 11 minutes at 0.3 mL/minute. At the same time, 48 g of VAc with 0.48 g of NDM were added over ~1 hour (at 0.86 mL/minute). At the end of the VAc-NDM addition, 912 g of VAc with 9.12 g of NDM were added over ~4 hours 11 minutes (at 3.9 mL/minute) and 2.88 g of NaPS in 100 g of distilled water was added over ~2 hours at 0.4 mL/minute, Upon completion of the additions, the reaction was further cooked for 1 hour at 80° C.

EXAMPLE 2.59

187 g of distilled water, 1.25 g of sodium bicarbonate, 1.25 g of sodium citrate were introduced into the 1 liter reactor and temperature was set at 80° C. Once the temperature was reached, 1.58 g of NaPS solubilised in 12.5 g of distilled water and 48 g of VAc with 0.48 g of NDM were added over ~1 hour under agitation (150 rpm). After 1 hour, at the end of the additions, 228 g of VAc with 2.28 g of NDM were added over ~4 hours 11 minutes; at the same time the following solutions were added over ~4 hours 11 minutes, i)0.72 g of NaPS in 25 g of distilled water, ii)9.6 g of AMPS in 15.4 g of distilled water. Upon completion of the additions, the reaction was further cooked for 1 hour at 80° C.

Different formulation have been scaled-up in the 500 liter (0.5T) and 1000 liter (1.0T) reactors.

TABLE 2.10

| Sample | Reactor | TSC [%] | RVT [cP] | pH | PS [nm] | $M_n$ [g/mol] | $M_w$ [g/mol] | PDI |
|---|---|---|---|---|---|---|---|---|
| 2.60 | 0.5 T | 35.2 | 15.0 | 4.43 | 240 | 111,900 | 1,430,100 | 12.8 |
| 2.61 | 0.5 T | 36.3 | 3.0 | 5.3 | 320 | 40,600 | 267,600 | 6.6 |
| 2.62 | 1.0 T | 36.0 | 8.0 | 5.3 | 326 | — | — | — |
| 2.63 | 1.0 T | 41.0 | 23.5 | 5.0 | 213 | 16,500 | 87,200 | 5.3 |
| 2.64 | 0.5 T | 51.0 | 33.5 | 5.1 | 312 | 19,500 | 102,300 | 5.3 |
| 2.65 | 1.0 T | 49.8 | 113.5 | 5.1 | 195 | 21,300 | 108,800 | 5.1 |
| 2.66 | 1.0 T | 53.7 | 588.0 | 5.2 | 205 | 17,200 | 117,700 | 6.9 |
| 2.67 | 1.0 T | 53.4 | 268.0 | 5.1 | 233 | 26,000 | 118,100 | 4.6 |

EXAMPLE 2.60

277.7 kg of distilled water, 0.292 kg of sodium bicarbonate, 0.292 kg of sodium citrate were introduced into the reactor and temperature was set at 80° C. Once the temperature was reached, 0.641 kg of NaPS solubilised in 6.408 kg of distilled water was introduced under agitation. 17.494 kg of VAc was added over ~30 minutes. At the end of the addition, 157.445 kg of VAc was added over ~2 hours, at the same time the following solutions were added over ~2 hours, i) 0.233 kg of NaPS in 21.696 kg of distilled water, ii) 7.013 kg of AMPS in 14.916 kg of distilled water. Upon completion of the additions, the reaction was further cooked for 1 hour at 80° C. At 65° C., 0.053 kg of tBHP was charged and 10 minutes later, 0.053 kg of Ascorbic acid solubilised in 0.534 kg of distilled water was added over 10 minutes.

EXAMPLE 2.61

271.59 kg of distilled water, 2.355 kg of sodium bicarbonate, 2.355 kg of sodium citrate and 4.716 kg of AMPS were introduced into the reactor and temperature was set at 80° C. Once the temperature was reached, 1.177 kg of NaPS solubilised in 11.773 kg of distilled water was introduced under agitation. 17.659 kg of VAc was added over ~30 minutes. At the end of the addition, 158.929 kg of VAc was added over ~2 hours, at the same time the following solutions were added over ~2 hours, i) 0.589 kg of NaPS in 16.688 kg of distilled water, ii) 2.359 kg of AMPS in 14.916 kg of distilled water. Upon completion of the additions, the reaction was further cooked for 1 hour at 80° C. At 65° C., 0.053 kg of tBHP was charged and 10 minutes later, 0.053 kg of Ascorbic acid solubilised in 0.534 kg of distilled water was added over 10 minutes.

EXAMPLE 2.62

Repeat of example 2.61 scale up in the 1T reactor instead of the 0.5T reactor.

EXAMPLE 2.63

520 kg of distilled water, 4.16 kg of sodium bicarbonate, 4.16 kg of sodium citrate were introduced into the reactor and temperature was set at 80° C. Once the temperature was reached, 2.8 kg of NaPS solubilised in 3 kg of distilled water was introduced under agitation. 20 kg of VAc mixed with 0.2 kg of NDM were added over ~1 hour. At the end of the addition, 380 kg of VAc mixed with 3.8 kg of NDM were added over ~4 hours, at the same time the following solutions were added over ~4 hours, i) 1.2 kg of NaPS in 27.6 kg of distilled water, ii) 16 kg of AMPS in 12.8 kg of distilled water. Upon completion of the additions, the reaction was further cooked for 1 hour at 80° C. At 65° C., 0.15 kg of tBHP was charged and 10 minutes later, 0.2 kg of Ascorbic acid solubilised in 2.8 kg of distilled water was feed over 10 minutes. At 30° C., 0.1 kg of antifoam and 0.686 kg of $H_2O_2$ were added.

EXAMPLE 2.64

215.1 kg of distilled water, 2.486 kg of sodium bicarbonate, 2.48 kg of sodium citrate were introduced into the reactor and temperature was set at 80° C. Once the temperature was reached, 1.673 kg of NaPS was introduced under agitation. 11.95 kg of VAc mixed with 0.12 kg of NDM were added over ~1 hour. At the end of the addition, 227.05 kg of VAc mixed with 2.271 kg of NDM were added over ~4 hours, at the same time the following solutions were added over ~4 hours, i) 0.717 kg of NaPS in 16.491 kg of distilled water, ii) 9.56 kg of AMPS in 7.648 kg of distilled water. Upon completion of the additions, the reaction was further cooked for 1 hour at 80° C. At 65° C., 0.089 kg of tBHP was charged and 10 minutes later, 0.086 kg of Ascorbic acid solubilised in 0.621 kg of distilled water was added over 10 minutes.

EXAMPLE 2.65

Repeat of example 2.63 scale up in 1T reactor instead of 0.5T reactor, except at the end of the run where, 0.1 kg of antifoam and 0.403 kg of $H_2O_2$ were added at 30° C.

EXAMPLE 2.66

390 kg of distilled water, 5.4 kg of sodium bicarbonate, 5.4 kg of sodium citrate were introduced into the reactor and temperature was set at 80° C. Once the temperature was reached, 3.64 kg of NaPS was introduced under agitation. 26 kg of VAc mixed with 0.26 kg of NDM were added over ~1 hour. At the end of the addition, 494 kg of VAc mixed with 4.94 kg of NDM were added over ~4 hours, at the same time 20.8 kg of AMPS in 14.56 kg of distilled water was added over ~4 hours and 1.56 kg of NaPS in 33.8 kg of distilled water was added over ~4 hours 15 minutes. Upon completion of the additions of NaPS solution, the reaction was further cooked for 1 hour at 85° C. At 75° C. and at 65° C., 0.193 kg of tBHP was charged and 10 minutes later, 0.169 kg of Ascorbic acid solubilised in 1.352 kg of distilled water was feed over 10 minutes. At 30° C., 0.13 kg of antifoam and 0.446 kg of $H_2O_2$ were added.

EXAMPLE 2.67

390 kg of distilled water, 5.4 kg of sodium bicarbonate, 5.4 kg of sodium citrate were introduced into the reactor and temperature was set at 80° C. Once the temperature was reached, 3.64 kg of NaPS was introduced under agitation. 26 kg of VAc mixed with 0.31 kg of NDM were added over ~1 hour. At the end of the addition, 494 kg of VAc mixed with 5.928 kg of NDM were added over ~4 hours, at the same time 20.8 kg of AMPS in 14.56 kg of distilled water was added over ~4 hours and 1.56 kg of NaPS in 33.8 kg of distilled water was added over ~4 hours 15 minutes. Upon completion of the additions of NaPS solution, the reaction was further cooked for 1 hour at 85° C. At 75° C., 0.193 kg of tBHP was charged and 10 minutes later, 0.156 kg of Ascorbic acid solubilised in 1.352 kg of distilled water was feed over 10 minutes. At 30° C., 0.13 kg of antifoam and 0.446 kg of H2O2 were added.

Generally, emulsions obtained utilising a seed stage process generated a good stability against freeze-thaw cycles (in which a sample of the emulsion (2 mL) was frozen for 2 hours and then thawed). This cycle was repeated three times and the stability assessed visually).

Moreover, these emulsions also demonstrated shear stability (measured by pumping the emulsion in a tube (diameter=0.8 mm) at 30%, 20% and 10% of TSC for 1 hour at 10, 20, 30 and 40 mL/minute; the viscosity was measured before and after these experiments using a Brookfield DV-I viscometer®. The measurements being carried out with a spindle 1 at 25° C., and stability being defined as the measurements remaining within ±2 mPas).

2.B Production of PVC Using Unhydrolysed Copolymer Obtained by Emulsion Polymerisation The polymers mentioned above were used as secondary suspending agents in the suspension polymerisation of vinyl chloride as will now be described.

Reactions were carried out in a PVC Pilot Plant 1 liter Buchi® stainless steel reactor, using the following conditions:
Temperature: 57° C.
Stirrer speed: 750 rpm
Stirrer type: Standard (as supplied)

TABLE 2.11

| | |
|---|---|
| Demineralised water | 350 g |
| Vinyl chloride monomer | 189 g |
| Di(4-tert-butylcyclohexyl) peroxydicarbonate, | 1000 ppm (w/w) solids on vinyl chloride |
| Primary suspending agent Alcotex ® B72 (supplied by Synthomer (UK) Ltd.), poly(vinyl alcohol) having a degree of hydrolysis of 72.0-74.0 mole % and a block distribution of acetate groups, 4% (w/w) aqueous solution | 1,000 ppm (w/w) solids on vinyl chloride |
| Secondary suspending agent, specified example of this invention | variable ppm (w/w) solids on vinyl chloride |
| Sodium bicarbonate (1% (w/w) solution in demineralised water) | 800 ppm (w/w) solids on vinyl chloride |

Demineralised water, suspending agents, buffer and initiator were all charged to a 1 liter Büchi® stainless steel reactor (which had been previously coated with Alcotex® 225 Build-up suppressant supplied by Synthomer (UK) Ltd.) and assembled onto the rig. The recipes were designed to give a final grain size that was consistent with a typical commercial product. The reactor was then pressure tested, degassed to atmospheric and then vinyl chloride monomer charged via a volumetric bomb under nitrogen pressure. A suspension of vinyl chloride was prepared by stirring at 750 rpm. The reactor was then heated to the desired polymerisation temperature of 57° C. within 6 minutes, and at 750 rpm, this was maintained until the maximum pressure was recorded, and the reaction stopped after a pressure drop of 0.2 Mpa (by cooling and degassing to atmospheric pressure). The reactor was then subjected to a vacuum of approximately 50 kPa for 45 minutes. The reactor contents were then decanted in to a filter funnel and washed twice with 1% (w/w) sodium lauryl sulfate solution (as an anti-static treatment). The sample was then placed in a circulating fan oven at 50° C. for 12 hours to dry.

The resulting PVC samples were analysed for grain size ($D_{50}$), grain size distribution (GSD), cold plasticiser absorption (CPA), bulk density (BD) and packing factor (PF). Measurement of these parameters is discussed above in Part 1.

TABLE 2.12

| Example No. | Sulfur monomer: VAc [% (w/w)] | $D_{50}$ [µm] | GSD | CPA [%] | BD [g/L] | PF |
|---|---|---|---|---|---|---|
| C. Ex. 400 * | N/A | 166 | 0.26 | 23.6 | 513 | 49.7 |
| C. Ex. 2 ** | N/A | 134 | 0.38 | 29.0 | 511 | 51.4 |
| C. Ex. 401 (1) | N/A | 152 | 0.27 | 22.5 | 492 | 47.1 |
| C. Ex. 402 (2) | N/A | 224 | 0.28 | 28.2 | 547 | 54.5 |
| 2.41 | 0 | 214 | 0.61 | 27.6 | 526 | 52.1 |

TABLE 2.12-continued

| Example No. | Sulfur monomer: VAc [% (w/w)] | $D_{50}$ [µm] | GSD | CPA [%] | BD [g/L] | PF |
|---|---|---|---|---|---|---|
| 2.2 | 1.7 | 145 | 0.29 | 21.2 | 511 | 47.8 |
|  |  | 159 | 0.23 | 22.2 | 533 | 51.4 |
| 2.3 | 1.7 | 126 | 0.21 | 34.1 | 467 | 49.3 |
| 2.4 | 2.3 | 124 | 0.21 | 31.3 | 461 | 47.9 |
|  |  | 126 | 0.20 | 32.2 | 451 | 48.7 |
| 2.5 | 2.3 | 130 | 0.21 | 34.8 | 468 | 49.9 |
| 2.6 | 3.0 | 147 | 0.25 | 28.3 | 495 | 50.9 |
| 2.7 | 3.7 | 125 | 0.20 | 23.6 | 506 | 48.7 |
| 2.10 | 1.75 | 151 | 0.24 | 28.4 | 505 | 50.4 |
| 2.14A | 1.70 | 122 | 0.21 | 33.8 | 439 | 46.2 |
| 2.15 | 2.3 | Unstable |  |  |  |  |
| 2.17 | 1.75 | 132 | 0.22 | 35.5 | 465 | 49.8 |
| 2.18 | 2.30 | 125 | 0.20 | 31.0 | 459 | 47.1 |
| 2.19 | 1.75 | 150 | 0.40 | 33.6 | 456 | 47.9 |
| 2.20 | 1.70 | 134 | 0.21 | 29.4 | 504 | 50.8 |
| 2.21 | 1.66 | 127 | 0.19 | 28.8 | 451 | 46.2 |
| 2.24 | 2.00 | 197 | 0.22 | 23.2 | 519 | 51.9 |
| 2.25 | 2.00 | 130 | 0.21 | 29.4 | 504 | 50.8 |
| 2.26 | 1.70 | 123 | 0.21 | 27.4 | 508 | 50.2 |
| 2.27 | 1.75 | 123 | 0.22 | 33.0 | 457 | 47.7 |
| 2.28 | 1.73 | 159 | 0.25 | 26.8 | 508 | 49.8 |
| 2.29 | 3.20 | 127 | 0.20 | 31.6 | 462 | 47.7 |
| 2.30 | 0.88 | 150 | 0.40 | 28.6 | 508 | 50.8 |
| 2.32 | 1.73 | 270 | 0.18 | 24.2 | 528 | 50.5 |
| 2.39 | 1.73 | 141 | 0.25 | 29.2 | 503 | 50.6 |
| 2.42 | 2.00 | 165 | 0.25 | 25.3 | 494 | 47.8 |
|  |  | 176 | 0.24 | 27.4 | 483 | 47.7 |
| 2.45 | 2.00 | 169 | 0.23 | 25.4 | 517 | 50.0 |
| 2.47 | 2.00 | 163 | 0.23 | 26.2 | 500 | 48.8 |
| 2.48 | 2.00 | 126 | 0.21 | 29.6 | 481 | 48.5 |
| 2.54 | 2.00 | 126 | 0.19 | 27.0 | 477 | 47.0 |
| 2.55 | 2.00 | 130 | 0.19 | 30.0 | 474 | 48.1 |
| 2.56 | 2.00 | 164 | 0.23 | 30.1 | 450 | 46.7 |

* No secondary suspending agent
** Average results
(1), C. Ex. 401 is a solid polyvinyl acetate, M30 ®, supplied by Synthomer (UK) Ltd, Mw = 85,000 g/mol
(2), C. Ex. 402 is an acrylic copolymer dispersion, Plextol ® R760, supplied by Synthomer (Deutschland) GmbH, In Table 2.12, the Example No. indicates the identity of the polymer used as the secondary suspending agent, where that polymer is in accordance with the present invention. The polymer was charged at a level of 500 ppm based on the vinyl chloride, except for C. Ex. 402 where the polymer+ stabiliser was 500 ppm based on vinyl chloride. The data of Table 2.12 clearly show that the emulsion polymers of the Examples may be used successfully as secondary suspending agents, particularly in relation to the suspension polymerisation of vinyl chloride. The CPA values of the polymer produced using the polymers of the Examples are comparable to, and in many cases better than, the CPA values shown by the polymer synthesised using the conventional secondary suspending agent, C. Ex. 2. The CPA values are seen to vary with the amount of sulfur-containing monomer in the secondary suspending agent, there being an optimum value of about 2-3% (w/w) for the content of the sulfur-containing monomer. Furthermore, the grain size distribution (GSD) of the PVC made using the polymers of the Examples are typically lower than the GSD of the PVC made using the conventional secondary suspending agent.

Samples obtained with seed stage process have also been tested in sPVC (suspension polymerisation of vinyl chloride monomer); in addition, lower amounts of secondary suspending agent were also evaluated in the formulation.

TABLE 2.13

| Example No. | Charged [ppm] | $D_{50}$ [µm] | GSD | CPA [%] | BD [g/L] | PF |
|---|---|---|---|---|---|---|
| C. Ex. 400* | 0 | 166 | 0.26 | 23.6 | 513 | 49.7 |
| C. Ex. 2** | 500 | 134 | 0.38 | 29.0 | 511 | 51.4 |
| 2.42 | 500 | 165 | 0.25 | 25.3 | 494 | 47.8 |
|  |  | 176 | 0.24 | 27.4 | 483 | 47.7 |
| 2.42 | 400 | 140 | 0.34 | 30.4 | 481 | 49.1 |
| 2.42 | 310 | 124 | 0.22 | 30.0 | 493 | 50.1 |
| 2.47 | 500 | 163 | 0.23 | 26.2 | 504 | 48.9 |
| 2.47 | 400 | 127 | 0.19 | 30.4 | 471 | 48.0 |
| 2.55 | 500 | 130 | 0.19 | 30.0 | — | — |
| 2.55 | 400 | 125 | 0.19 | 32.0 | 488 | 50.4 |
| 2.55 | 350 | 123 | 0.22 | 29.2 | 459 | 46.2 |
| 2.60 | 500 | 223 | 0.62 | 26.2 | 491 | 47.9 |
| 2.60 | 300 | 123 | 0.21 | 30.2 | 499 | 50.8 |
| 2.61 | 500 | 163 | 0.22 | 25.6 | 504 | 48.9 |
| 2.61 | 400 | 127 | 0.19 | 30.4 | 471 | 48.0 |
| 2.61 | 300 | 131 | 0.15 | 29.4 | 489 | 49.3 |
| 2.62 | 400 | 122 | 0.24 | 32.8 | 482 | 50.3 |
| 2.63 | 500 | 115 | 0.25 | 34.2 | 478 | 50.5 |
| 2.63 | 400 | 121 | 0.24 | 33.8 | 468 | 49.2 |
| 2.63 (1) | 400 | 124 | 0.20 | 30.2 | 497 | 50.5 |
| 2.63 | 300 | 121 | 0.23 | 32.4 | 501 | 52.0 |
| 2.64 | 500 | 127 | 0.19 | 29.4 | 497 | 49.9 |
| 2.64 | 400 | 123 | 0.24 | 30.2 | 493 | 50.1 |
| 2.64 (1) | 400 | 124 | 0.21 | 31.6 | 495 | 51.0 |
| 2.64 | 300 | 135 | 0.24 | 29.3 | 490 | 49.4 |
| 2.65 | 500 | 114 | 0.28 | 22.6 | 520 | 48.9 |
| 2.65 | 300 | 123 | 0.22 | 20.2 | 530 | 52.7 |
| 2.66 | 500 | 130 | 130 | 32.2 | 495 | 51.3 |
| 2.66 | 400 | 135 | 135 | 29.2 | 509 | 51.2 |
| 2.66 | 300 | 137 | 0.25 | 29.8 | 512 | 51.8 |
| 2.67 | 500 | 134 | 0.21 | 29.8 | 501 | 50.8 |

* No secondary suspending agent
** Average results
(1)-emulsion solubilised in MeOH The results in Table 2.13 indicate that emulsion of the polymer produced in the presence of a seed performed well at lower loadings.

Generally, good grain size control was observed. The polymers produced on a large scale (1T) performed in a similar manner to those produced on the laboratory scale.

PVC was synthesised in a 10 liter reactor using the polymer of the present invention, and the experimental results are shown in Table 2.14

TABLE 2.14

| Example No. | Charged [ppm] | $D_{50}$ [µm] | GSD | CPA [%] | BD [g/L] | PF |
|---|---|---|---|---|---|---|
| C. Ex. 2 | 500 | 136 | 0.27 | 30.2 | 497 | 50.5 |
| C. Ex. 2* | 500 | 135 | 0.29 | 28.8 | 505 | 50.6 |
| 2.61 | 500 | 153 | 0.24 | 27.2 | 515 | 51.0 |
| 2.61 | 400 | 139 | 0.26 | 26.4 | 523 | 51.1 |
| 2.63 | 500 | 120 | 0.25 | 27.4 | 502 | 49.6 |
| 2.63 | 400 | 171 | 0.25 | 25.8 | 543 | 52.8 |
| 2.63 | 300 | 156 | 0.24 | 26.0 | 545 | 53.1 |
| 2.64 | 500 | 138 | 0.26 | 27.4 | 533 | 52.7 |
| 2.64 | 400 | 152 | 0.26 | 25.8 | 543 | 52.8 |
| 2.64 | 300 | 175 | 0.19 | 24.6 | 545 | 52.3 |
| 2.65 | 500 | 166 | 0.24 | 28.0 | 527 | 52.7 |
| 2.65 | 400 | 153 | 0.24 | 27.0 | 539 | 53.0 |
| 2.65* | 400 | 145 | 0.27 | 27.2 | 544 | 53.7 |
| 2.65 | 300 | 156 | 0.24 | 27.6 | 538 | 53.2 |

*in the presence of a significant level of oxygen

The data obtained on the 10 liter PVC pilot plant showed that the grain size values obtained for PVC resin with sulfonated PVAc Secondary Suspending Agents were in the range of 130 to 180 µm, together with CPA values of 24-28% which are close to the conventional Secondary Suspending agent, C. Ex. 2, but with the advantage of better atom efficiency in their manufacture and substantially no solvents being present.

Whilst the present invention has been described and illustrated with reference to particular embodiments, it will be appreciated by those of ordinary skill in the art that the invention lends itself to many different variations not specifically illustrated herein. By way of example only, certain possible variations will now be described. The examples above illustrate the use of polymers as secondary suspending agents for the manufacture of PVC. The polymers may be used for the manufacture of other polymers. The polymer used as a secondary suspending agent may have a different composition from those described in the examples above.

VCM desorption kinetics has been performed on the PVC resins obtained in the 10 liter reactor with sulfonated PVAc and compared to C. Ex. 301 at various loadings.

The resin was filtered after reaction and dried in the 70° C. oven. The samples are taken at 0, 5, 15, 30, 60 and 120 min. For the first three samples at 0, 5, 15 minutes (0.1 g of PVC sample was dissolved in 10 mL of cyclohexanone) whereas for samples at 30, 60 and 120 minutes 0.25 g of PVC was dissolved in 10 mL of cyclohexanone. After addition of the cyclohexane sample were left to stir until PVC dissolve.

The level of residual VCM in each sample was measured by GC headspace method with a limit of detection of 1 ppm and a limit of quantification of 50 ppm. 0.1/0.25 g of PVC sample was dissolved in 10 mls of cyclohexanone in a 20 mL headspace vial. VCM was extracted from the headspace of the vial using a PDMS carboxen SPME fibre® (supplied by Supelco) at 50° C. for 30 minutes. The SPME fibre was then desorbed for 3 minutes in the Shimadzu GC-MS® injector and run using a 60M HP-5 (1.25 mm+1 μm)® column (supplied by Agilent Technologies Inc.). A set of DCM standards were prepared in the range of 100-0.1 ppm and were injected directly onto the Shimadzu GC-MS® and run in the same way.

The results of the desorption experiments for VCM (%) as a function of time for PVC resins produced using various polymers as secondary suspending agents is shown in FIG. 1 (C. Ex. 2 (△—1 liter reactor, ▲—10 liter reactor), Example 2.61 (◆—500 ppm, 10 liter reactor), Example 2.64 (■—400 ppm, 10 liter reactor, □—300 ppm, 10 liter reactor) and Example 2.63 (●—400 ppm, 10 L reactor, ○—300 ppm, 10 liter reactor).

As shown in FIG. 1, all of the samples showed similar behavior during the first 20 minutes of the desorption. At 30 minutes, and subsequent times, lower VCM % values were obtained for the PVC resins produced in the presence of the sulfonated PVAc than those produced with the standard secondary. It should be noted that the latter PVC possessed the highest CPA in Table 2.14 (30.2%). Moreover, FIG. 1 indicates that the VCM desorption was more efficient for those PVC resins produced using 400 ppm or 300 ppm of sulfonated polymer of this invention.

The PVC polymerisation examples demonstrated in the present application are of a type known as cold charged, with the primary and secondary suspending agents being present at the beginning of the charging sequence. Other methods are known. Usually, water, protective colloid(s) and further optional additives are charged to the reactor first and then the liquefied vinyl chloride monomer and optional comonomer(s) are added. Optionally, the charging of the protective colloid may be simultaneous with the vinyl chloride monomer into a pre-heated reactor containing some or all of the aqueous phase. Optionally, the charging of the protective colloid may be simultaneous with some or all of the hot demineralised water which forms the aqueous phase in such a way that by the time the water, colloid(s) and monomer (such as vinyl chloride) are charged the reactor is at or near to the desired polymerisation temperature. This process is known as 'hot charging'. Optionally, the initiator is then charged to the reactor.

The polyvinyl alcohol secondary suspending agent may be used in conjunction with other protective colloids, such as primary protective colloids and with other secondary and tertiary protective colloids. Specific examples of protective colloids are listed in Ullmann's Encyclopedia of Industrial Chemistry, 5th Edition, 1992, page722, Table 3.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above illustrate the use of polymers as secondary suspending agents for the manufacture of PVC. The polymers may be used for the manufacture of other polymers.

The polymer used as a secondary suspending agent may have a different composition from those described in the examples above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A secondary suspending agent for a suspension polymerisation reaction, wherein the secondary suspending agent comprises a solution or an emulsion of a copolymer comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester group, sulfonamide or sulfonyl halide group comprising one polymerisable carbon-carbon double bond per monomer attached to a sulfonate ($SO_3^-$) group, sulfonic acid ($-SO_3H$) group, sulfonic ester ($-SO_3R$) group, sulfonamide or sulfonyl halide ($-SO_3X$) group, and in the case of a sulfonate or sulfonic acid group, the sulfonate or sulfonic acid group being directly attached to the polymerisable double-double bond, or attached to the polymerisable double-double bond via a linker comprising a C1-C6 alkylene group, wherein, the degree of hydrolysis of the polymer being from 0 to 5 mol %.

2. The secondary suspending agent according to claim 1, wherein the secondary suspending agent is added to a suspension polymerisation reaction mixture.

3. The secondary suspending agent according to claim 1, wherein the polymer is made by emulsion polymerisation, or derived from said emulsion polymer.

4. The secondary suspending agent according to claim 3, wherein the polymer being formed by emulsion polymerisation in the presence of a seed.

5. The secondary suspending agent according to claim 4, wherein the seed comprises a seed polymer.

6. The secondary suspending agent according to claim 1, wherein the polymer is made by polymerisation in a dispersed media, or solution or bulk polymerisation.

7. The secondary suspending agent according to claim 1, wherein the polymer comprising residues of more than one ester- containing monomer.

8. The secondary suspending agent according to claim 1, wherein the ester-containing monomer comprising a polymerisable C=C group attached to an ester group, there being no linker group between the polymerisable C=C group and the ester group, the ester group being arranged with the —O— moiety adjacent to the C=C group or the ester group being arranged with the C=O moiety adjacent to the C=C group.

9. The secondary suspending agent according to claim 1, wherein the ester-containing monomer comprising vinyl acetate, vinyl benzoate, vinyl 4-tert-butylbenzoate, vinyl chloroformate, vinyl cinnamate, vinyl decanoate, vinyl neononanoate, vinyl neodecanoate, vinyl pivalate, vinyl propionate, vinyl stearate, vinyl trifluoroacetate, vinyl valerate, methyl vinyl acetate, propenyl acetate, methyl propenyl acetate, ethyl propenyl acetate, butenyl acetate, methyl butenyl acetate, vinyl propanoate, propenyl propanoate, vinyl butyrate, vinyl hexanoate, vinyl heptanoate, vinyl octanoate, vinyl 2-propylheptanoate, vinyl nonanoate, vinyl neononanoate or vinyl trifluoroacetate, and/or the monomer comprising a sulfonate, sulfonic acid, sulfonic ester, sulfonamide or sulfonyl halide group comprises sodium vinyl sulfonate, sodium allyl sulfonate, 2-methyl-2-propene-1-sulfonic acid sodium salt and 2-acrylamido-2-methylpropane sulfonic acid sodium salt, 3-sulfopropyl (meth)acrylate, sodium 1-allyloxy-2-hydroxypropyl sulfonate, a linear or branched $C_1$-$C_{10}$-alkylsulfonamide of acrylic acid or of methacrylic acid or a ω-alkene-1-sulfonic acids having 2 to 10 C atoms.

10. The secondary suspending agent according to claim 1, wherein the copolymer comprises up to 5 mol % of residues of monomers comprising a sulfonate, sulfonic acid, sulfonic ester, sulfonamide or sulfonyl halide group.

11. The secondary suspending agent according to claim 1, wherein the copolymer comprising at least 90% by weight of residues of the at least one ester-containing monomer and residues of the at least one monomer comprising a sulfonate, sulfonic acid, sulfonic ester, sulfonamide or sulfonyl halide group, optionally some of the ester residues being hydrolysed to provide a degree of hydrolysis of up to 5 mol %, the remainder of the polymer being provided by other residues not being residues of the at one least one ester-containing monomer and residues of the at least one monomer comprising a sulfonate, sulfonic acid, sulfonic ester, sulfonamide or sulfonyl halide.

12. The secondary suspending agent according to claim 1, wherein the degree of hydrolysis being substantially nil.

13. A suspension polymerisation reaction composition comprising;
    a continuous phase in which is dispersed droplets of one or more monomers to be polymerised;
    one or more primary suspending agents; and
    at least one secondary suspending agent comprising a copolymer comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester, sulfonamide or sulfonyl halide group comprising one polymerisable carbon-carbon double bond per monomer attached to a sulfonate ($SO_3^-$) group, sulfonic acid (—$SO_3H$) group, sulfonic ester (—$SO_3R$) group, sulfonamide or sulfonyl halide (—$SO_3X$) group, and
    in the case of a sulfonate or sulfonic acid group, the sulfonate or sulfonic acid group being directly attached to the polymerisable double-double bond, or attached to the polymerisable double-double bond via a linker comprising a C1-C6 alkylene group,
    wherein, the degree of hydrolysis of the polymer being no more than 5 mol %.

14. The reaction composition according to claim 13, wherein the one or more monomers to be polymerised comprises a monomer comprising a polymerisable vinyl (C=C) group and one or more co-monomers.

15. The reaction composition according to claim 13, wherein the primary suspending agent comprises one or more polyvinyl acetates having a degree of hydrolysis of about 70-90 mol %, and optionally one or more cellulose-based polymers.

16. The reaction composition according to claim 13, which is suitable for free radical addition polymerisation.

17. The reaction composition according to claim 13, comprising 100 parts by weight of the one or more monomers to be polymerised, 85 to 130 parts by weight of continuous phase, 0.04 to 0.22 parts by weight of primary suspending agent, 0.001 to 0.20 parts by weight of said secondary suspending agent comprising said polymer and 0.03 to 0.15 parts by weight of initiator.

18. The reaction composition according to claim 13, in which the weight of the primary suspending agent used in the composition is at least 0.5 times and optionally at least 5.0 times the weight of said secondary suspending agent comprising said polymer, and/or the composition comprises 20-2000 ppm of said secondary suspending agent relative to the weight of said one or more monomers to be polymerised.

19. A method of making a polymer using suspension polymerisation, the method comprising:
    polymerising one or more monomers in the presence of a secondary suspending agent comprising (i) residues of at least one ester-containing monomer, the ester-containing monomer(s) comprising one polymerisable carbon-carbon double bond per monomer and an ester group, and (ii) one or more residues of at least one monomer comprising a sulfonate, sulfonic acid, sulfonic ester, sulfonamide or sulfonyl halide group, the monomer(s) comprising a sulfonate, sulfonic acid, sulfonic ester, sulfonamide or sulfonyl halide group comprising one polymerisable carbon-carbon double bond per monomer attached to a sulfonate ($SO_3^-$) group, sulfonic acid (—$SO_3H$) group, sulfonic ester (—$SO_3R$) group, sulfonamide or sulfonyl halide (—$SO_3X$) group, and
    in the case of a sulfonate or sulfonic acid group, the sulfonate or sulfonic acid group being directly attached to the polymerisable double-double bond, or attached to the polymerisable double-double bond via a linker comprising a C1-C6 alkylene group,
wherein, the degree of hydrolysis of the polymer being no more than 5 mol %.

20. The secondary suspending agent according to claim 1, wherein the secondary suspending agent is partially hydrolysed such that a proportion of said ester groups form alcohol groups.

21. The secondary suspending agent according to claim 8, wherein the ester group is arranged with the —O— moiety adjacent to the C=C group.

22. The secondary suspending agent according to claim 8, wherein the ester group is arranged with the C=O moiety adjacent to the C=C group.

23. The secondary suspending agent according to claim 1, wherein the polymer has an Mn of no more than 50,000.

24. The reaction composition according to claim 13, wherein the polymer has an Mn of no more than 50,000.

25. The method according to claim 19, wherein the polymer has an Mn of no more than 50,000.

* * * * *